US012339454B2

(12) United States Patent
Lam et al.

(10) Patent No.: US 12,339,454 B2
(45) Date of Patent: Jun. 24, 2025

(54) DISPLAY SYSTEMS WITH WAVEGUIDE CONFIGURATION TO MITIGATE RAINBOW EFFECT

(71) Applicant: Meta Platforms Technologies, LLC, Menlo Park, CA (US)

(72) Inventors: Wai Sze Tiffany Lam, Lynnwood, WA (US); Yang Yang, Redmond, WA (US); Dominic Meiser, Bothell, WA (US); Wanli Chi, Sammamish, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 611 days.

(21) Appl. No.: 17/674,573

(22) Filed: Feb. 17, 2022

(65) Prior Publication Data
US 2023/0258938 A1    Aug. 17, 2023

(51) Int. Cl.
*G02B 27/01*    (2006.01)
(52) U.S. Cl.
CPC .... *G02B 27/0172* (2013.01); *G02B 2027/011* (2013.01); *G02B 2027/0116* (2013.01); *G02B 2027/0138* (2013.01)
(58) Field of Classification Search
None
See application file for complete search history.

(56) References Cited

U.S. PATENT DOCUMENTS

| | | |
|---|---|---|
| 2016/0041384 A1 | 2/2016 | Robbins et al. |
| 2021/0055551 A1 | 2/2021 | Chi et al. |
| 2021/0199873 A1* | 7/2021 | Shi ..................... G02B 27/0018 |

OTHER PUBLICATIONS

International Search Report and Written Opinion for International Application No. PCT/US2023/013226, mailed May 25, 2023, 11 pages.
Wang B., et al., "Compact Slanted Grating Couplers," Optics Express, Jul. 26, 2004, vol. 12, No. 15, 14 pages.

* cited by examiner

*Primary Examiner* — Bao-Luan Q Le
*Assistant Examiner* — Danell L Owens
(74) *Attorney, Agent, or Firm* — Greenberg Traurig, LLP

(57) ABSTRACT

According to examples, a display system may include a wearable eyewear arrangement that may include a lens assembly having a projector to propagate display light associated with an image. The lens assembly may also include a waveguide configuration for propagating the display light to an eyebox. The waveguide configuration may include a volume Bragg grating (VBG) component for propagating the display light from a projector to an eyebox. The VBG component may include at least one tilt adjusted grating facilitated by adjustment in an original grating vector (k) direction of a grating by a pre-determined value. The tilt adjusted grating may facilitate to mitigate a rainbow effect observable in a gazing direction of the eyebox. The rainbow effect may be mitigated by modification of a rainbow ghost path away from the gazing direction without affecting propagation of the image pertaining to the display light.

20 Claims, 15 Drawing Sheets

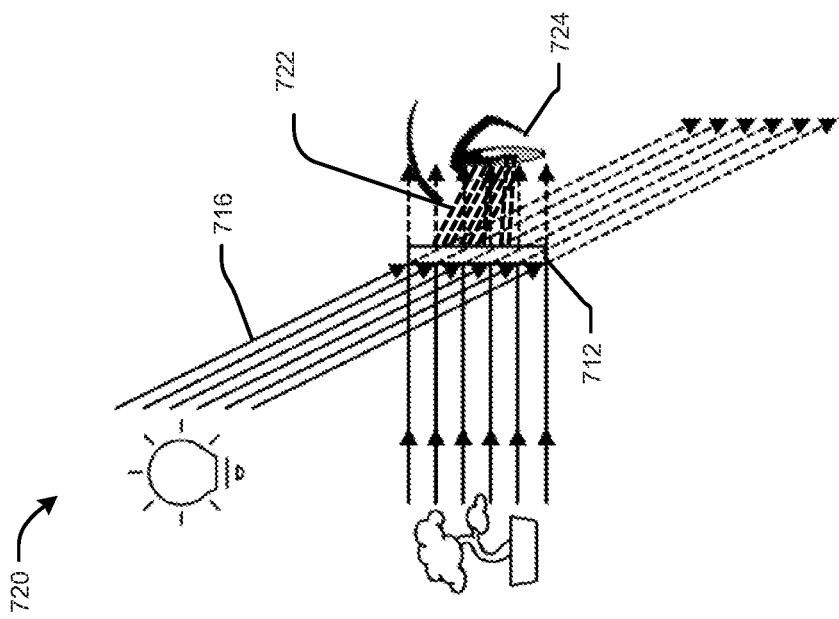
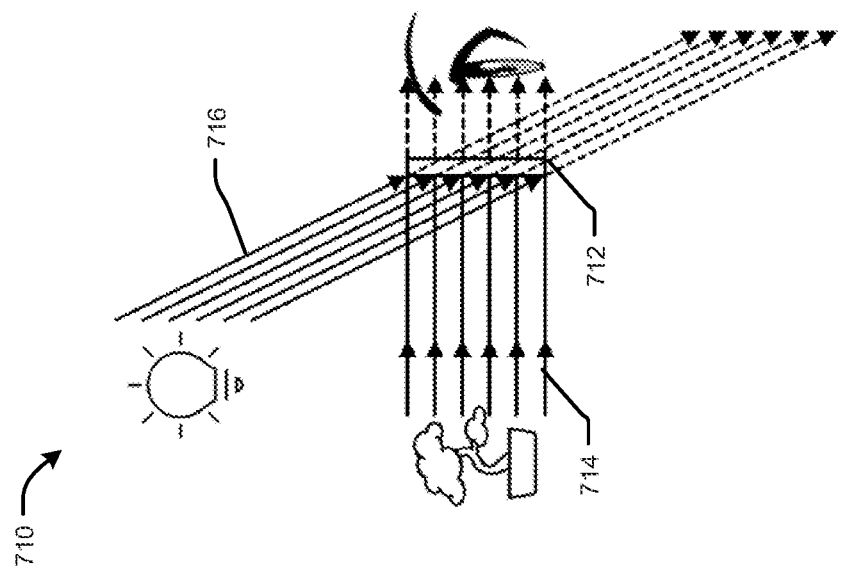
FIG. 7A

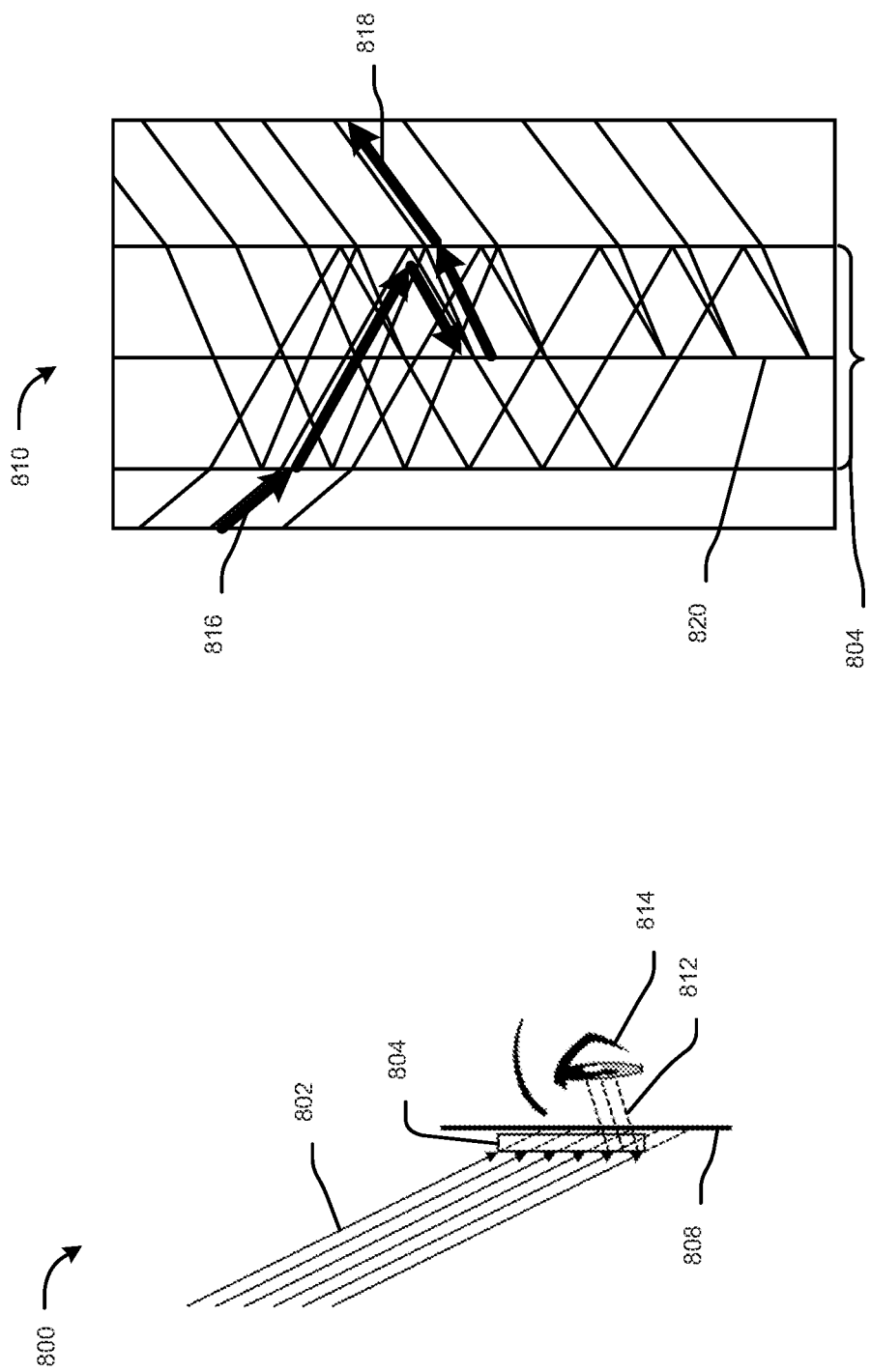

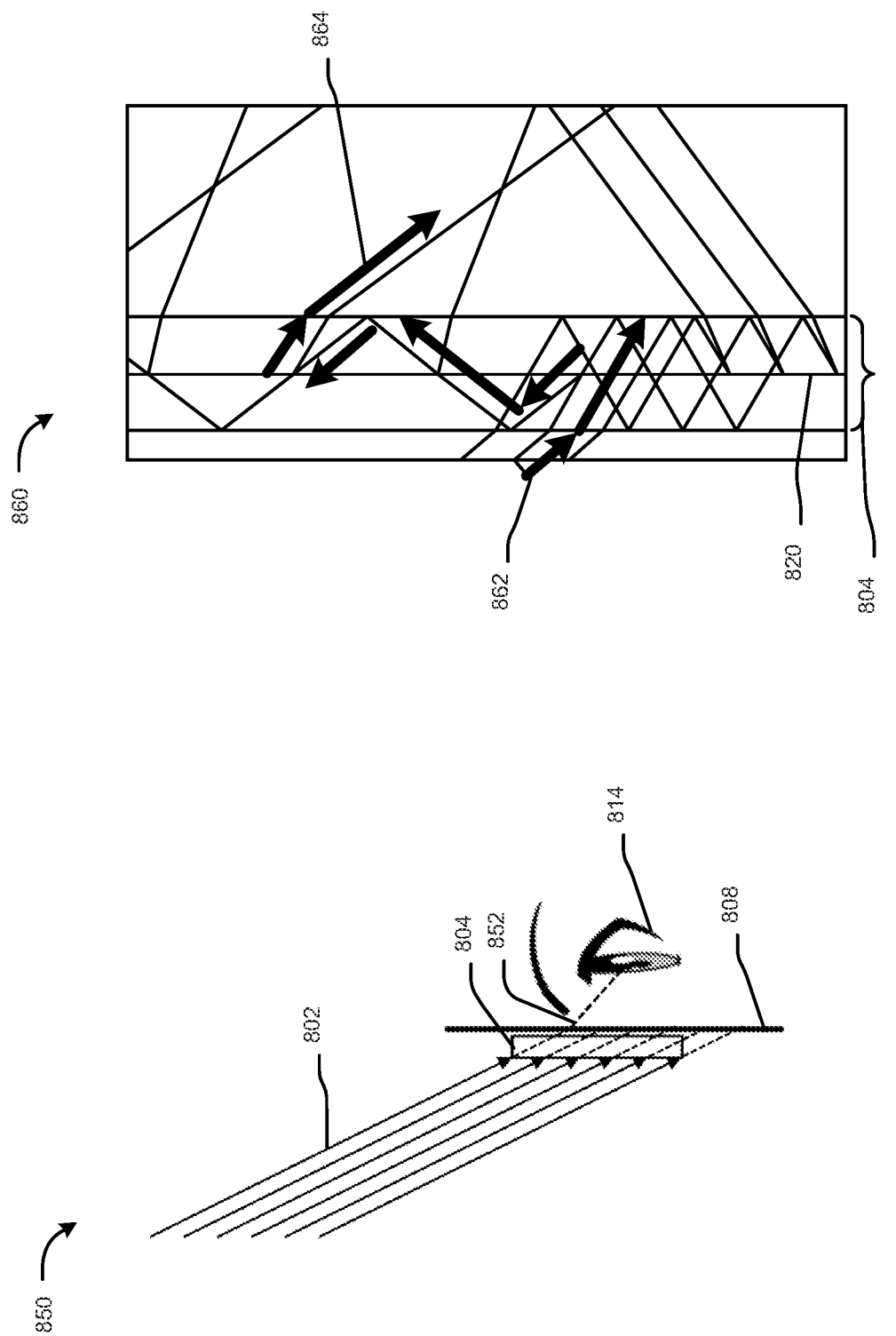

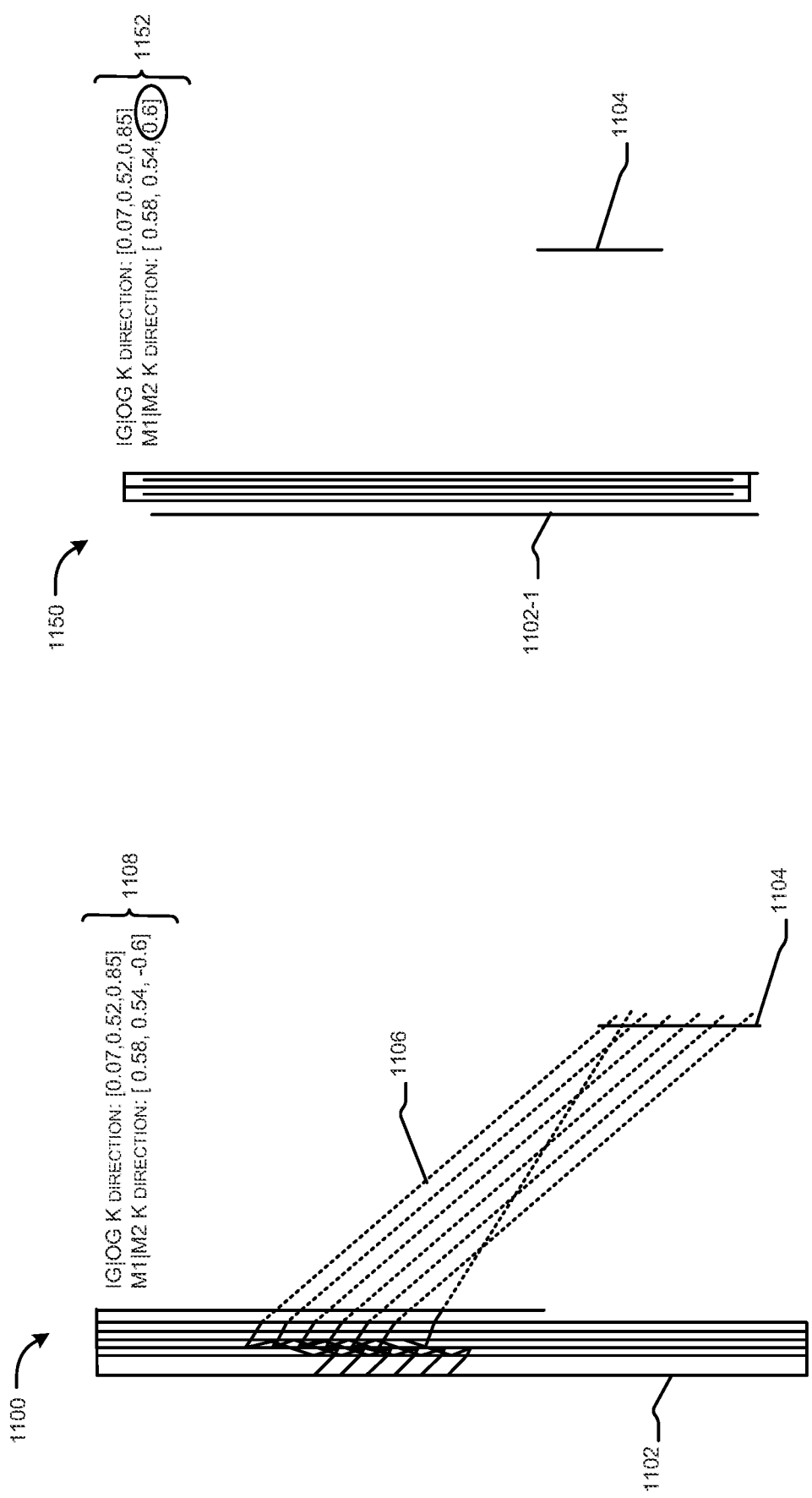

DISPLAY SYSTEMS WITH WAVEGUIDE CONFIGURATION TO MITIGATE RAINBOW EFFECT

TECHNICAL FIELD

This patent application relates generally to display systems, and more specifically, to display systems that include a waveguide configuration to mitigate, prevent, or minimize a rainbow effect observable in a gazing direction of an eyebox.

BACKGROUND

With recent advances in technology, prevalence and proliferation of content creation and delivery has increased greatly. In particular, interactive content such as virtual reality (VR) content, augmented reality (AR) content, mixed reality (MR) content, and content within and associated with a real and/or virtual environment (e.g., a "metaverse") has become appealing to consumers.

To facilitate delivery of this and other related content, service providers have endeavored to provide various forms wearable display systems. One such example may be a head-mounted device (HMD), such as wearable eyewear, wearable headset, or eyeglasses. In some examples, the head-mounted device (HMD) may employ a first projector and a second projector to propagate a first image and a second image, respectively, to generate "binocular" vision for viewing by a user. However, it may be difficult to obtain high quality images due to any number of optical aberrations or side effects, such as the formation of a rainbow effect caused by unwanted external light or other light source.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

FIG. 7A illustrates a diagram showing deviation of external light causing rainbow effect.

FIGS. 8A-8B illustrate a diagram showing various types of rainbow effect caused by different types of deviation in external light.

FIG. 11A illustrates a diagram showing presence of crosstalk rainbow effect in a typical waveguide configuration.

FIG. 11B illustrates a diagram showing a waveguide configuration having tilt adjusted grating for mitigation of the crosstalk rainbow effect shown in FIG. 11A, according to an example.

DETAILED DESCRIPTION

Figure 1:
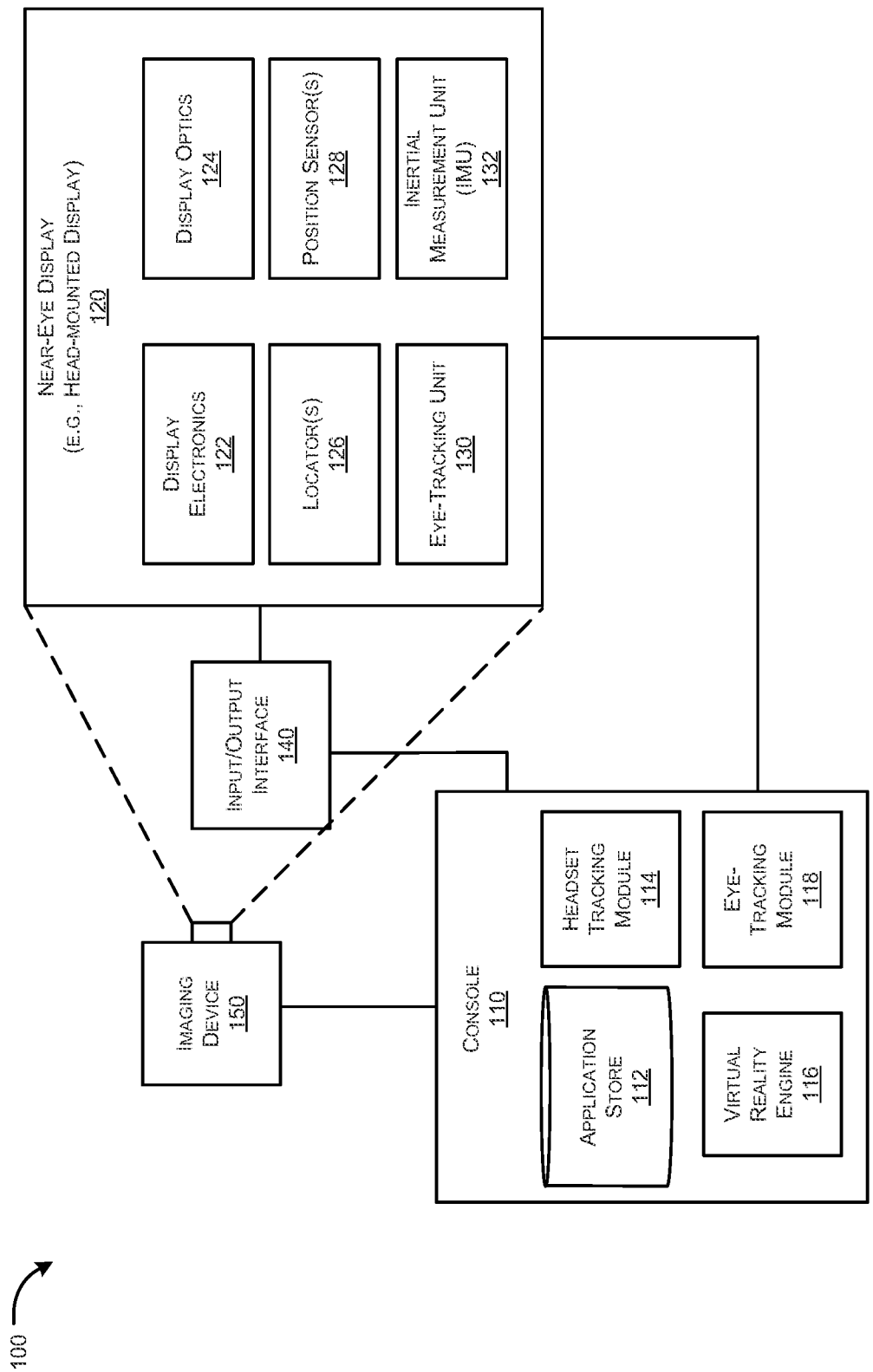
FIG. 1 illustrates a block diagram of an artificial reality system environment including a near-eye display, according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

In general display systems, such as, AR-based head-mounted devices and/or eyewear devices employ waveguide configuration that include VBGs/VBG components to propagate light associated with an image from a projector to an eyebox. However, a typical grating or VBG may cause undesired partial deviation of collimated external light, especially by the middle grating/output grating of waveguide configuration. The undesired partial deviation of external light, which may be otherwise expected to completely pass through the grating, may cause formation of a rainbow effect observable in a gazing direction of the eyebox. The rainbow effect may be due to a corresponding rainbow ghost path formed by the undesired partial deviation of external light. The appearance of the rainbow effect may affect the quality of the image displayed to a user and thus, may negatively impact a user's experience with such display systems. Furthermore, the user may experience poor visual acuity and significant visual discomfort, which often results in dizziness, eye fatigue, or other side effects.

The systems and methods described herein may provide a display system (e.g., AR-based head-mounted device (HMD) or eyewear) including a waveguide configuration to mitigate a rainbow effect observable in a gazing direction of a eyebox. The waveguide configuration may include a volume Bragg grating (VBG) component for propagating the display light from a projector to an eyebox. In some examples, the VBG component may include at least one tilt adjusted grating facilitated by adjustment in an original grating vector (k) direction of a grating by a pre-determined value. The tilt adjusted grating may facilitate to mitigate a rainbow effect observable in a gazing direction of the eyebox. In some examples, the rainbow effect may be mitigated by modification of a rainbow ghost path away from the gazing direction without affecting propagation of the image pertaining to the display light. As used herein, "rainbow effect" may refer to a ghost image caused by rainbow ghost path, which may be a result of undesired deviation of external light by a grating, wherein the external light may be otherwise expected to pass through the grating without any deviation. As used herein, a VBG may be a substantially and/or completely transparent optical device or component that may exhibit a periodic variation of refractive index. As used herein, a waveguide/waveguide configuration may be an optical structure that propagates a variety of signals (e.g., optical signals, electromagnetic waves, sound waves, etc.) in one or more directions. Employing principles of physics, information contained in such signals, may be directed using any number of waveguides or similar components.

The systems and methods disclosed herein may provide display systems that may have waveguide configuration with VBG components that have modified grating characteristics to mitigate, prevent or minimize a rainbow effect observable on the display systems. The display systems (e.g., AR-based head-mounted device (HMD) or eyewear) described herein may include a wearable eyewear arrangement that includes a lens assembly. The lens assembly may include a projector for propagating display light associated with an image and a waveguide configuration for propagating the display light to an eyebox. The display light may be associated with an image that may be viewable by a user of the display system as the image is displayed on the eyebox. The rainbow effect in the gazing direction of the eyebox may be caused by rainbow ghost path that may be a result of undesired deviation of external collimated light partially deviated by typical grating. However, the systems and methods described herein discloses modified grating characteristics of the VBG component to mitigate the rainbow effect. The modified grating characteristics is mainly implemented on the concept that the rainbow ghost path can be shifted above or below the possible gazing directions of the eyebox. For example, if the rainbow ghost path is propagated slightly above than top portion of the eyebox, the rainbow effect may not be visible in the gazing direction of the eyebox. In addition, the system and methods describe herein also ensure that propagation path of the display light pertaining to the image does not change significantly. In some examples, the modified grating characteristics may pertain to at least one tilt adjusted grating facilitated by adjustment in an original grating vector (k) direction of a grating by a pre-determined value. In some examples, the pre-determined value may pertain to a change in a co-ordinate or a tilt axis pertaining to the original grating vector (k) direction of the grating. In some examples, the tilt adjusted grating may be attained by partial tilting or flipping of the grating to change the co-ordinate or the tilt axis by the pre-determined value. This may be based on type of the rainbow effect and/or requirements of the propagation of the display light pertaining to the image. The presence of the tilt adjusted grating may alter the reflection or diffraction characteristics of rainbow ghost path, which are altered by the tilt adjusted grating in a direction above or below the gazing direction of the eyebox.

In some examples, the tilt adjusted grating may include the adjustment in the original grating vector (k) direction pertaining to at least one of an input grating, a middle grating or an output grating. In an example, the tilt adjusted grating may mitigate rainbow effect caused by an unexpected deviation of the rainbow ghost path by at least one of the output grating or the middle grating. For example, the tilt adjusted grating may mitigate a type-B rainbow effect that is a caused by a varied pitch response based upward deviation of collimated external light by the output grating. In another example, the tilt adjusted grating may mitigate a crosstalk ghost rainbow effect that is caused by a downward deviation of the collimated external light by the middle grating.

FIG. 1 illustrates a block diagram of an artificial reality system environment 100 including a near-eye display, according to an example. As used herein, a "near-eye display" may refer to a device (e.g., an optical device) that may be in close proximity to a user's eye. As used herein, "artificial reality" may refer to aspects of, among other things, a "metaverse" or an environment of real and virtual elements, and may include use of technologies associated with virtual reality (VR), augmented reality (AR), and/or mixed reality (MR). As used herein a "user" may refer to a user or wearer of a "near-eye display."

As shown in FIG. 1, the artificial reality system environment 100 may include a near-eye display 120, an optional external imaging device 150, and an optional input/output interface 140, each of which may be coupled to a console 110. The console 110 may be optional in some instances as the functions of the console 110 may be integrated into the near-eye display 120. In some examples, the near-eye display 120 may be a head-mounted display (HMD) that presents content to a user.

In some instances, for a near-eye display system, it may generally be desirable to expand an eyebox, reduce display haze, improve image quality (e.g., resolution and contrast), reduce physical size, increase power efficiency, and increase or expand field of view (FOV). As used herein, "field of view" (FOV) may refer to an angular range of an image as seen by a user, which is typically measured in degrees as observed by one eye (for a monocular HMD) or both eyes (for binocular HMDs). Also, as used herein, an "eyebox" may be a two-dimensional box that may be positioned in front of the user's eye from which a displayed image from an image source may be viewed.

In some examples, in a near-eye display system, light from a surrounding environment may traverse a "see-through" region of a waveguide configuration display (e.g., a transparent substrate) to reach a user's eyes. For example, in a near-eye display system, light of projected images may be coupled into a transparent substrate of a waveguide configuration, propagate within the waveguide configuration, and be coupled or directed out of the waveguide configuration at one or more locations to replicate exit pupils and expand the eyebox.

In some examples, the near-eye display 120 may include one or more rigid bodies, which may be rigidly or non-rigidly coupled to each other. In some examples, a rigid coupling between rigid bodies may cause the coupled rigid bodies to act as a single rigid entity, while in other examples, a non-rigid coupling between rigid bodies may allow the rigid bodies to move relative to each other.

In some examples, the near-eye display 120 may be implemented in any suitable form-factor, including a HMD, a pair of glasses, or other similar wearable eyewear or device. Examples of the near-eye display 120 are further described below with respect to FIGS. 2 and 3. Additionally, in some examples, the functionality described herein may be used in a HMD or headset that may combine images of an environment external to the near-eye display 120 and artificial reality content (e.g., computer-generated images). Therefore, in some examples, the near-eye display 120 may augment images of a physical, real-world environment external to the near-eye display 120 with generated and/or overlaid digital content (e.g., images, video, sound, etc.) to present an augmented reality to a user.

In some examples, the near-eye display 120 may include any number of display electronics 122, display optics 124, and an eye-tracking unit 130. In some examples, the near-eye display 120 may also include one or more locators 126, one or more position sensors 128, and an inertial measurement unit (IMU) 132. In some examples, the near-eye display 120 may omit any of the eye-tracking unit 130, the one or more locators 126, the one or more position sensors 128, and the inertial measurement unit (IMU) 132, or may include additional elements.

In some examples, the display electronics 122 may display or facilitate the display of images to the user according to data received from, for example, the optional console 110. In some examples, the display electronics 122 may include one or more display panels. In some examples, the display electronics 122 may include any number of pixels to emit light of a predominant color such as red, green, blue, white, or yellow. In some examples, the display electronics 122 may display a three-dimensional (3D) image, e.g., using stereoscopic effects produced by two-dimensional panels, to create a subjective perception of image depth.

In some examples, the display optics 124 may display image content optically (e.g., using optical waveguides and/or couplers) or magnify image light received from the display electronics 122, correct optical errors associated with the image light, and/or present the corrected image light to a user of the near-eye display 120. In some examples, the display optics 124 may include a single optical element or any number of combinations of various optical elements as well as mechanical couplings to maintain relative spacing and orientation of the optical elements in the combination. In some examples, one or more optical elements in the display optics 124 may have an optical coating, such as an anti-reflective coating, a reflective coating, a filtering coating, and/or a combination of different optical coatings.

In some examples, the display optics 124 may also be designed to correct one or more types of optical errors, such as two-dimensional optical errors, three-dimensional optical errors, or any combination thereof. Examples of two-dimensional errors may include barrel distortion, pincushion distortion, longitudinal chromatic aberration, and/or transverse chromatic aberration. Examples of three-dimensional errors may include spherical aberration, chromatic aberration field curvature, and astigmatism.

In some examples, the one or more locators 126 may be objects located in specific positions relative to one another and relative to a reference point on the near-eye display 120. In some examples, the optional console 110 may identify the one or more locators 126 in images captured by the optional external imaging device 150 to determine the artificial reality headset's position, orientation, or both. The one or more locators 126 may each be a light-emitting diode (LED), a corner cube reflector, a reflective marker, a type of light source that contrasts with an environment in which the near-eye display 120 operates, or any combination thereof.

In some examples, the external imaging device 150 may include one or more cameras, one or more video cameras, any other device capable of capturing images including the one or more locators 126, or any combination thereof. The optional external imaging device 150 may be configured to detect light emitted or reflected from the one or more locators 126 in a field of view of the optional external imaging device 150.

In some examples, the one or more position sensors 128 may generate one or more measurement signals in response to motion of the near-eye display 120. Examples of the one or more position sensors 128 may include any number of accelerometers, gyroscopes, magnetometers, and/or other motion-detecting or error-correcting sensors, or any combination thereof.

In some examples, the IMU 132 may be an electronic device that generates fast calibration data based on measurement signals received from the one or more position sensors 128. The one or more position sensors 128 may be located external to the IMU 132, internal to the IMU 132, or any combination thereof. Based on the one or more measurement signals from the one or more position sensors 128, the IMU 132 may generate fast calibration data indicating an estimated position of the near-eye display 120 that may be relative to an initial position of the near-eye display 120. For example, the IMU 132 may integrate measurement signals received from accelerometers over time to estimate a velocity vector and integrate the velocity vector over time to determine an estimated position of a reference point on the near-eye display 120. Alternatively, the IMU 132 may provide the sampled measurement signals to the optional console 110, which may determine the fast calibration data.

The eye-tracking unit 130 may include one or more eye-tracking systems. As used herein, "eye tracking" may refer to determining an eye's position or relative position, including orientation, location, and/or gaze of a user's eye. In some examples, an eye-tracking system may include an imaging system that captures one or more images of an eye and may optionally include a light emitter, which may generate light that is directed to an eye such that light reflected by the eye may be captured by the imaging system. In other examples, the eye-tracking unit 130 may capture reflected radio waves emitted by a miniature radar unit. These data associated with the eye may be used to determine or predict eye position, orientation, movement, location, and/or gaze.

In some examples, the near-eye display 120 may use the orientation of the eye to introduce depth cues (e.g., blur image outside of the user's main line of sight), collect heuristics on the user interaction in the virtual reality (VR) media (e.g., time spent on any particular subject, object, or frame as a function of exposed stimuli), some other functions that are based in part on the orientation of at least one of the user's eyes, or any combination thereof. In some examples, because the orientation may be determined for both eyes of the user, the eye-tracking unit 130 may be able to determine where the user is looking or predict any user patterns, etc.

In some examples, the input/output interface 140 may be a device that allows a user to send action requests to the optional console 110. As used herein, an "action request" may be a request to perform a particular action. For example, an action request may be to start or to end an application or to perform a particular action within the application. The input/output interface 140 may include one or more input devices. Example input devices may include a keyboard, a mouse, a game controller, a glove, a button, a touch screen, or any other suitable device for receiving action requests and communicating the received action requests to the optional console 110. In some examples, an action request received by the input/output interface 140 may be communicated to the optional console 110, which may perform an action corresponding to the requested action.

In some examples, the optional console 110 may provide content to the near-eye display 120 for presentation to the user in accordance with information received from one or more of external imaging device 150, the near-eye display 120, and the input/output interface 140. For example, in the example shown in FIG. 1, the optional console 110 may include an application store 112, a headset tracking module 114, a virtual reality engine 116, and an eye-tracking module 118. Some examples of the optional console 110 may include different or additional modules than those described in conjunction with FIG. 1. Functions further described below may be distributed among components of the optional console 110 in a different manner than is described here.

In some examples, the optional console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In some examples, the modules of the optional console 110 described in conjunction with FIG. 1 may be encoded as instructions in the non-transitory computer-readable storage medium that, when executed by the processor, cause the processor to perform the functions further described below. It should be appreciated that the optional console 110 may or may not be needed or the optional console 110 may be integrated with or separate from the near-eye display 120.

In some examples, the application store 112 may store one or more applications for execution by the optional console 110. An application may include a group of instructions that, when executed by a processor, generates content for presentation to the user. Examples of the applications may include gaming applications, conferencing applications, video playback application, or other suitable applications.

In some examples, the headset tracking module 114 may track movements of the near-eye display 120 using slow calibration information from the external imaging device 150. For example, the headset tracking module 114 may determine positions of a reference point of the near-eye display 120 using observed locators from the slow calibration information and a model of the near-eye display 120. Additionally, in some examples, the headset tracking module 114 may use portions of the fast calibration information, the slow calibration information, or any combination thereof, to predict a future location of the near-eye display 120. In some examples, the headset tracking module 114 may provide the estimated or predicted future position of the near-eye display 120 to the virtual reality engine 116.

In some examples, the virtual reality engine 116 may execute applications within the artificial reality system environment 100 and receive position information of the near-eye display 120, acceleration information of the near-eye display 120, velocity information of the near-eye display 120, predicted future positions of the near-eye display 120, or any combination thereof from the headset tracking module 114. In some examples, the virtual reality engine 116 may also receive estimated eye position and orientation information from the eye-tracking module 118. Based on the received information, the virtual reality engine 116 may determine content to provide to the near-eye display 120 for presentation to the user.

In some examples, the eye-tracking module 118 may receive eye-tracking data from the eye-tracking unit 130 and determine the position of the user's eye based on the eye tracking data. In some examples, the position of the eye may include an eye's orientation, location, or both relative to the near-eye display 120 or any element thereof. So, in these examples, because the eye's axes of rotation change as a function of the eye's location in its socket, determining the eye's location in its socket may allow the eye-tracking module 118 to more accurately determine the eye's orientation.

In some examples, a location of a projector of a display system may be adjusted to enable any number of design modifications. For example, in some instances, a projector may be located in front of a viewer's eye (i.e., "front-mounted" placement). In a front-mounted placement, in some examples, a projector of a display system may be located away from a user's eyes (i.e., "world-side"). In some examples, a head-mounted display (HMD) device may utilize a front-mounted placement to propagate light towards a user's eye(s) to project an image.

Figure 2:
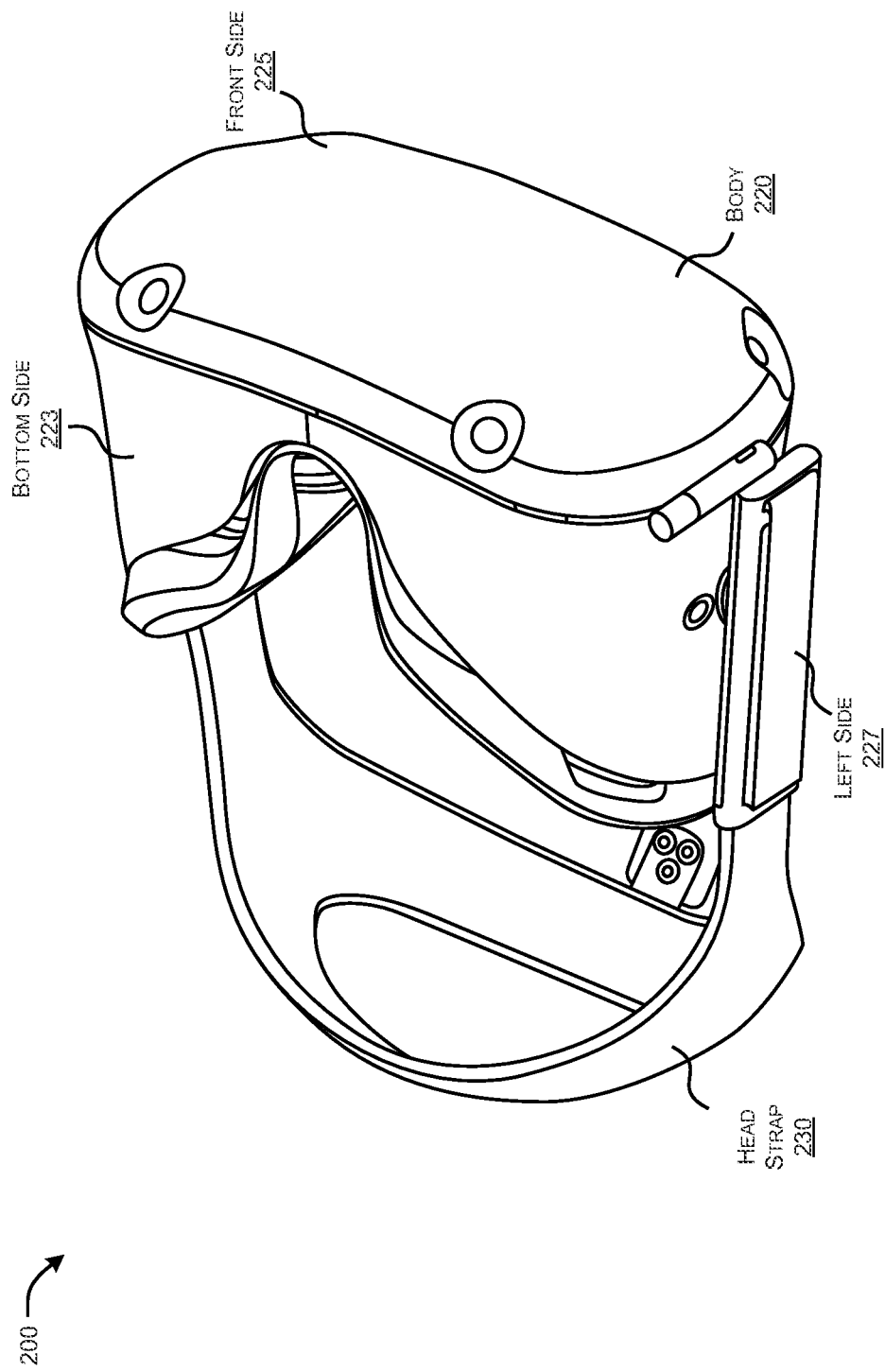
FIG. 2 illustrates a perspective view of a near-eye display in the form of a head-mounted display (HMD) device, according to an example.

FIG. 2 illustrates a perspective view of a near-eye display in the form of a head-mounted display (HMD) device 200, according to an example. In some examples, the HMD device 200 may be a part of a virtual reality (VR) system, an augmented reality (AR) system, a mixed reality (MR) system, another system that uses displays or wearables, or any combination thereof. In some examples, the HMD device 200 may include a body 220 and a head strap 230. FIG. 2 shows a bottom side 223, a front side 225, and a left side 227 of the body 220 in the perspective view. In some examples, the head strap 230 may have an adjustable or extendible length. In particular, in some examples, there may be a sufficient space between the body 220 and the head strap 230 of the HMD device 200 for allowing a user to mount the HMD device 200 onto the user's head. In some examples, the HMD device 200 may include additional, fewer, and/or different components.

In some examples, the HMD device 200 may present, to a user, media or other digital content including virtual and/or augmented views of a physical, real-world environment with computer-generated elements. Examples of the media or digital content presented by the HMD device 200 may include images (e.g., two-dimensional (2D) or three-dimensional (3D) images), videos (e.g., 2D or 3D videos), audio, or any combination thereof. In some examples, the images and videos may be presented to each eye of a user by one or more display assemblies (not shown in FIG. 2) enclosed in the body 220 of the HMD device 200.

In some examples, the HMD device 200 may include various sensors (not shown), such as depth sensors, motion sensors, position sensors, and/or eye tracking sensors. Some of these sensors may use any number of structured or unstructured light patterns for sensing purposes. In some examples, the HMD device 200 may include an input/output interface 140 for communicating with a console 110, as described with respect to FIG. 1. In some examples, the HMD device 200 may include a virtual reality engine (not shown), but similar to the virtual reality engine 116 described with respect to FIG. 1, that may execute applications within the HMD device 200 and receive depth information, position information, acceleration information, velocity information, predicted future positions, or any combination thereof of the HMD device 200 from the various sensors.

In some examples, the information received by the virtual reality engine 116 may be used for producing a signal (e.g., display instructions) to the one or more display assemblies. In some examples, the HMD device 200 may include locators (not shown), but similar to the virtual locators 126 described in FIG. 1, which may be located in fixed positions on the body 220 of the HMD device 200 relative to one another and relative to a reference point. Each of the locators may emit light that is detectable by an external imaging device. This may be useful for the purposes of head tracking or other movement/orientation. It should be appreciated that other elements or components may also be used in addition or in lieu of such locators.

It should be appreciated that in some examples, a projector mounted in a display system may be placed near and/or closer to a user's eye (i.e., "eye-side"). In some examples, and as discussed herein, a projector for a display system shaped liked eyeglasses may be mounted or positioned in a temple arm (i.e., a top far corner of a lens side) of the eyeglasses. It should be appreciated that, in some instances, utilizing a back-mounted projector placement may help to reduce size or bulkiness of any required housing required for a display system, which may also result in a significant improvement in user experience for a user.

Figure 3:
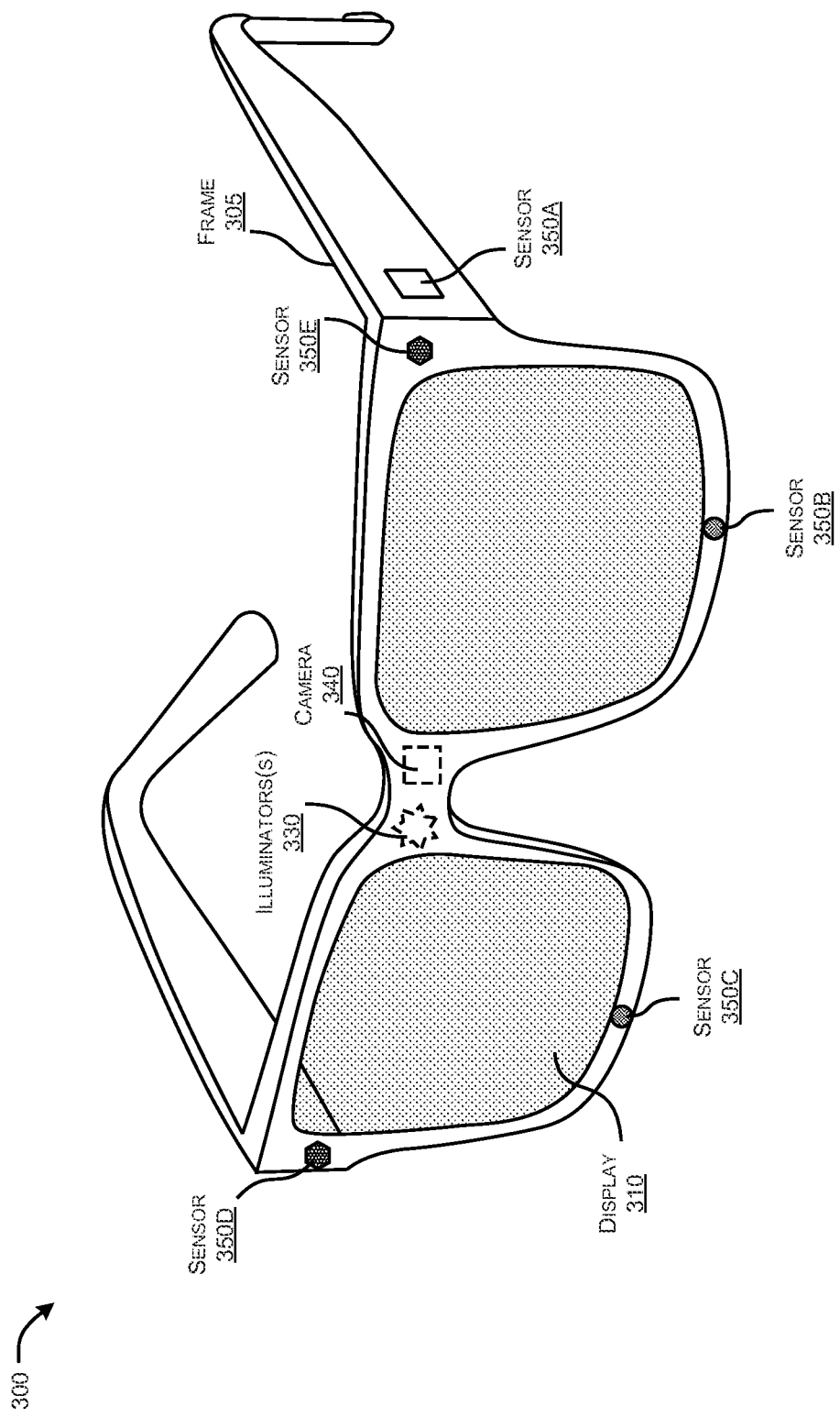
FIG. 3 is a perspective view of a near-eye display in the form of a pair of glasses, according to an example.

FIG. 3 is a perspective view of a near-eye display 300 in the form of a pair of glasses (or other similar eyewear), according to an example. In some examples, the near-eye display 300 may be a specific implementation of near-eye display 120 of FIG. 1, and may be configured to operate as a virtual reality display, an augmented reality display, and/or a mixed reality display.

In some examples, the near-eye display 300 may include a frame 305 and a display 310. In some examples, the display 310 may be configured to present media or other content to a user. In some examples, the display 310 may include display electronics and/or display optics, similar to components described with respect to FIGS. 1-2. For example, as described above with respect to the near-eye display 120 of FIG. 1, the display 310 may include a liquid crystal display (LCD) panel, a light-emitting diode (LED) display panel, or an optical display panel (e.g., a waveguide configuration display assembly). In some examples, the display 310 may also include any number of optical components, such as waveguides, gratings, lenses, etc.

In some examples, the near-eye display 300 may further include various sensors 350A, 350B, 350C, 350D, and 350E on or within a frame 305. In some examples, the various sensors 350A-350E may include any number of depth sensors, motion sensors, position sensors, inertial sensors, and/or ambient light sensors, as shown. In some examples, the various sensors 350A-350E may include any number of image sensors configured to generate image data representing different fields of views in one or more different directions. In some examples, the various sensors 350A-350E may be used as input devices to control or influence the displayed content of the near-eye display 300, and/or to provide an interactive virtual reality (VR), augmented reality (AR), and/or mixed reality (MR) experience to a user of the near-eye display 300. In some examples, the various sensors 350A-350E may also be used for stereoscopic imaging or other similar application.

In some examples, the near-eye display 300 may further include one or more illuminators 330 to project light into a physical environment. The projected light may be associated with different frequency bands (e.g., visible light, infra-red light, ultra-violet light, etc.), and may serve various purposes. In some examples, the one or more illuminators 330 may be used as locators, such as the one or more locators 126 described above with respect to FIGS. 1-2.

In some examples, the near-eye display 300 may also include a camera 340 or other image capture unit. The camera 340, for instance, may capture images of the physical environment in the field of view. In some instances, the captured images may be processed, for example, by a virtual reality engine (e.g., the virtual reality engine 116 of FIG. 1) to add virtual objects to the captured images or modify physical objects in the captured images, and the processed images may be displayed to the user by the display 310 for augmented reality (AR) and/or mixed reality (MR) applications.

Figure 4:
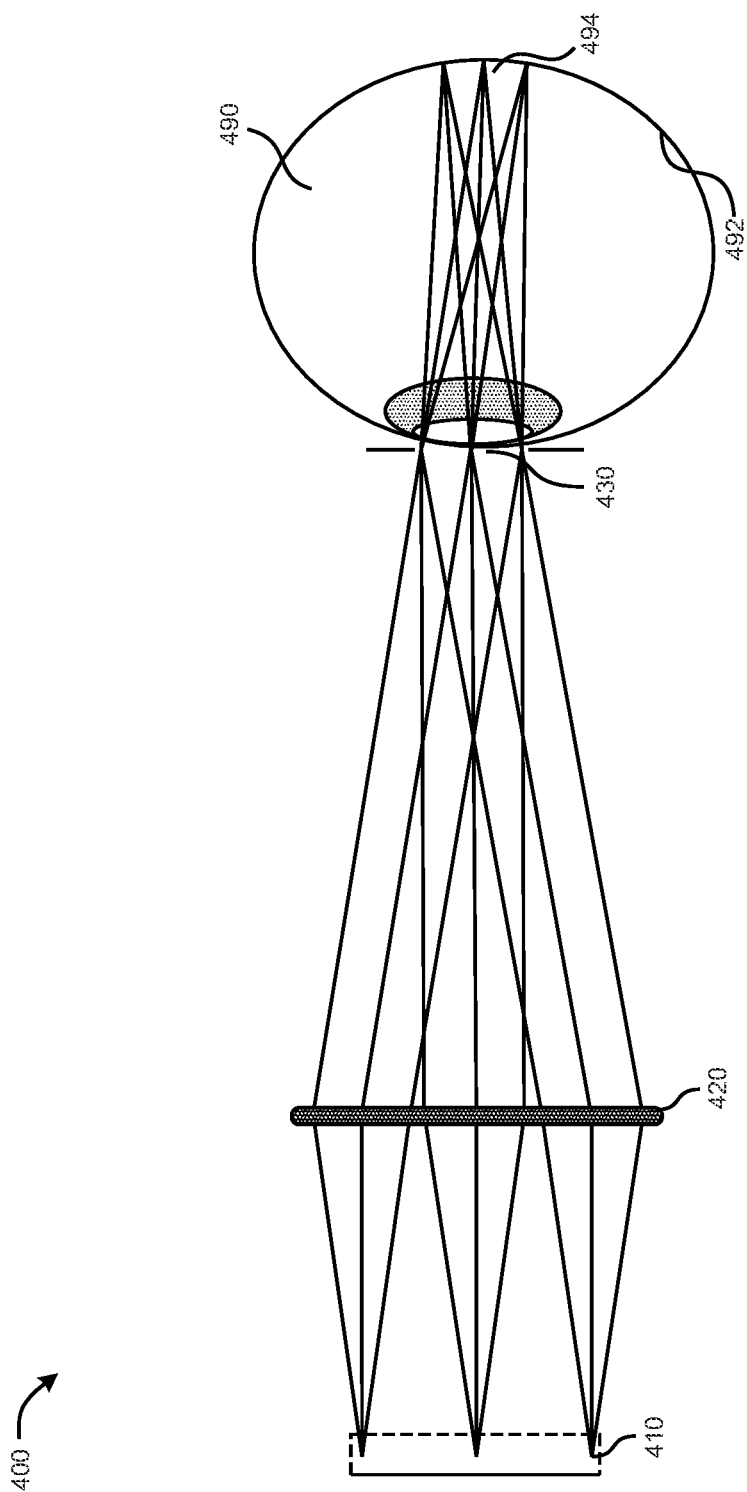
FIG. 4 illustrates a schematic diagram of an optical system in a near-eye display system, according to an example.

FIG. 4 illustrates a schematic diagram of an optical system 400 in a near-eye display system, according to an example. In some examples, the optical system 400 may include an image source 410 and any number of projector optics 420 (which may include waveguide configuration having gratings as discussed herein). In the example shown in FIG. 4, the image source 410 may be positioned in front of the projector optics 420 and may project light toward the projector optics 420. In some examples, the image source 410 may be located outside of the field of view (FOV) of a user's eye 490. In this case, the projector optics 420 may include one or more reflectors, refractors, or directional couplers that may deflect light from the image source 410 that is outside of the field of view (FOV) of the user's eye 490 to make the image source 410 appear to be in front of the user's eye 490. Light from an area (e.g., a pixel or a light emitting device) on the image source 410 may be collimated and directed to an exit pupil 430 by the projector optics 420. Thus, objects at different spatial locations on the image source 410 may appear to be objects far away from the user's eye 490 in different viewing angles (i.e., fields of view (FOV)). The collimated light from different viewing angles may then be focused by the lens of the user's eye 490 onto different locations on retina 492 of the user's eye 490. For example, at least some portions of the light may be focused on a fovea 494 on the retina 492. Collimated light rays from an area on the image source 410 and incident on the user's eye 490 from a same direction may be focused onto a same location on the retina 492. As such, a single image of the image source 410 may be formed on the retina 492.

In some instances, a user experience of using an artificial reality system may depend on several characteristics of the optical system, including field of view (FOV), image quality (e.g., angular resolution), size of the eyebox (to accommodate for eye and head movements), and brightness of the light (or contrast) within the eyebox. Also, in some examples, to create a fully immersive visual environment, a large field of view (FOV) may be desirable because a large field of view (FOV) (e.g., greater than about 60°) may provide a sense of "being in" an image, rather than merely viewing the image. In some instances, smaller fields of view may also preclude some important visual information. For example, a head-mounted display (HMD) system with a small field of view (FOV) may use a gesture interface, but users may not readily see their hands in the small field of view (FOV) to be sure that they are using the correct motions or movements. On the other hand, wider fields of view may require larger displays or optical systems, which may influence the size, weight, cost, and/or comfort of the head-mounted display (HMD) itself.

In some examples, a waveguide configuration may be utilized to couple light into and/or out of a display system. In particular, in some examples and as described further below, light of projected images may be coupled into or out of the waveguide configuration using any number of reflective or diffractive optical elements, such as gratings. For example, as described further below, VBGs components may be utilized in a waveguide configuration-based, back-mounted display system (e.g., a pair of glasses or similar eyewear).

In some examples, combination of VBGs may be used to diffract display light from a projector to a user's eye. Furthermore, in some examples, the VBGs may also help compensate for any dispersion of display light caused by each other to reduce the overall dispersion in a waveguide configuration-based display system.

Figure 5:
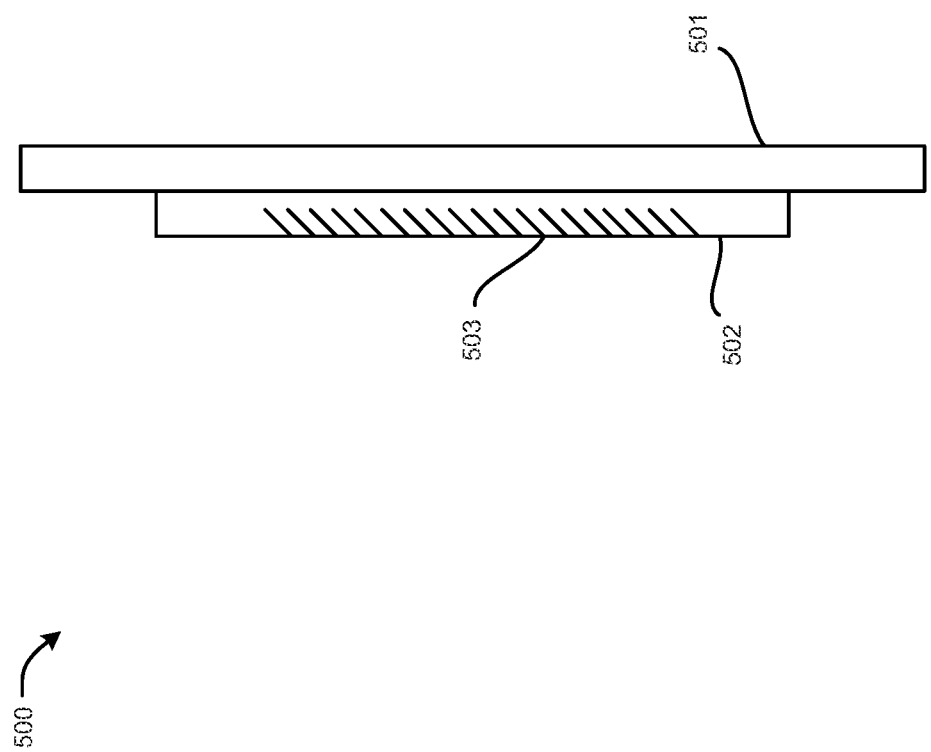
FIG. 5 illustrates a diagram of a waveguide configuration, according to an example.

FIG. 5 illustrates a diagram of a waveguide configuration 500, according to an example. In some examples, the waveguide configuration 500 may include a plurality of layers, such as at least one substrate 501 and at least one photopolymer layer 502. In some examples, the substrate 501 may be a comprised of a polymer or glass material. In some examples, the photopolymer layer 502 may be transparent or "see-through", and may include any number of photosensitive materials (e.g., a photo-thermo-refractive glass) or other similar material.

In some examples, the at least one substrate 501 and the at least one photopolymer layer 502 may be optically bonded (e.g., glued on top of each other) to form the waveguide configuration 500. In some examples, the overall thickness of the waveguide configuration may be in the range of 0.1-1.6 millimeters (mm) or other thickness range. In some examples, the photopolymer layer 502 may be a film layer having a thickness of anywhere between about 10 to 100 micrometers (μm) or other range.

In some examples, the VBGs may be provided in (or exposed into) the photopolymer layer 502. That is, in some examples, VBGs (with modified grating characteristics) may be exposed by generating an interference pattern 503 into the photopolymer layer 502. In some examples, the interference pattern 503 may be generated by superimposing two lasers to create a spatial modulation that may generate the interference pattern 503 in and/or throughout the photopolymer layer 502. In some examples, the interference pattern 503 may be a sinusoidal pattern. Also, in some examples, the interference pattern 503 may be made permanent via a chemical, optical, mechanical, or other similar process.

By exposing the interference pattern 503 into the photopolymer layer 502, for example, the refractive index of the photopolymer layer 502 may be altered and the VBGs may be provided in the photopolymer layer 502. It should also be appreciated that other various techniques to provide VBGs in or on the photopolymer layer 502 may also be provided.

Figure 6:
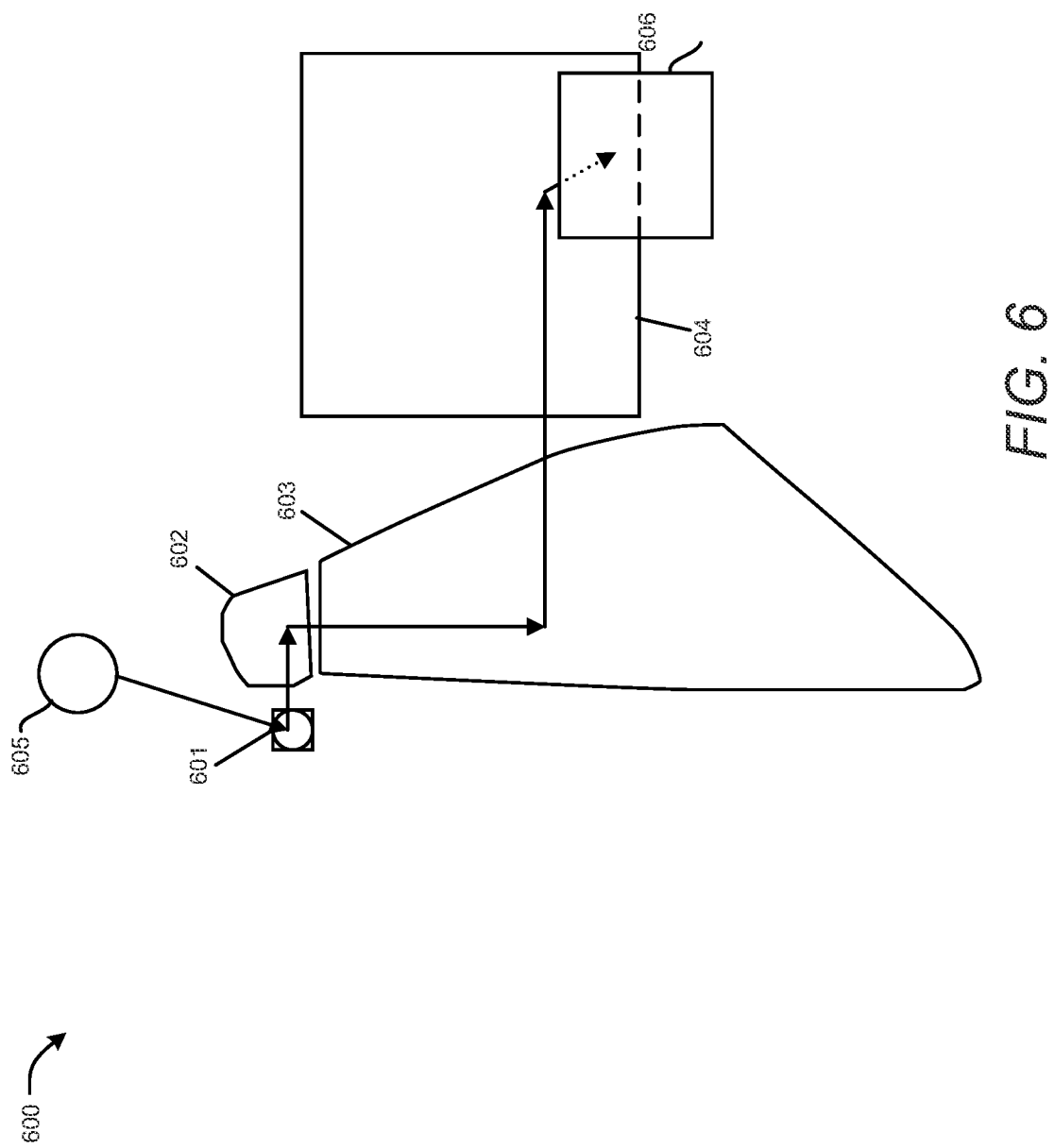
FIG. 6 illustrates a diagram of a typical waveguide configuration.

FIG. 6 illustrates a diagram of a typical waveguide configuration 600 used in a display system. The waveguide configuration 600, as shown, may include an input component 602, a first middle component (or first component M1) 604, a second middle component (or second component M2) 606, and an output component 608. In a typical configuration, a projector 605 of the display system may transmit display light (indicated by an arrow) to waveguide configuration 600, starting with the input component 601 (which receives the display light from the projector). The display light is then reflected to the first middle component 602 and the second middle component 603, and then to the output component 604 which propagates the display light to an eyebox or a user's eye 606.

In a typical configuration, when all components i.e. input component 602, the first middle component 604, the second middle component 606, and the output component 608 may be VBGs having typical grating characteristics, it may be possible that collimated external light may be subjected to undesired partial deviation. This means that the collimated external light, which otherwise may be expected to pass through grating without any reflection, may be deviated partially by the typical VBG. The partial deviation may lead to a rainbow ghost path, thereby causing the rainbow effect. The systems and methods described herein implement a waveguide configuration with modified grating characteristics, which may modify the rainbow ghost path in a direction away from the gazing direction of the eyebox, thus mitigating the rainbow effect.

FIG. 7A illustrates a diagram representation showing deviation of external light causing rainbow effect. The representation 710 may show display light 714 (corresponding to an image) that may be directed from a projector to a waveguide configuration 712 including a VBG. The display light may be propagated by the waveguide configuration 712 to display the image in an AR environment. The representation 710 also shows collimated external light 716. As shown in 710, in an ideal scenario, the collimated external light 716 may be expected to pass through the waveguide configuration 712, without getting deviated. However, in an actual scenario (in 720), the collimated external light 716 may be partially deviated (rays 722) by the waveguide configuration 712. The undesired partial deviated rays 722 may be due to rainbow ghost path that may cause rainbow effect in the gazing direction of eyebox 724.

Figure 7B:
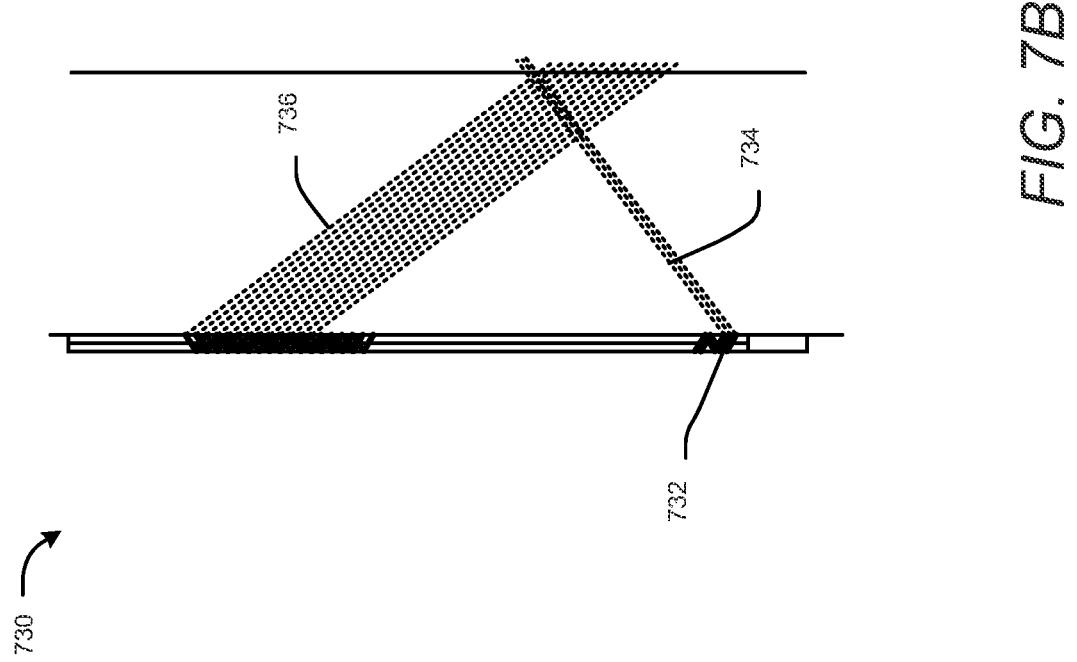
FIG. 7B illustrates a diagram showing formation of various types of ghost path causing the rainbow effect.

FIG. 7B illustrates formation of various types of ghost path causing the rainbow effect. As shown in FIG. 7B, collimated external light may pass through a waveguide configuration 732 having gratings, wherein the collimated external light may be partially deviated by the waveguide configuration 732. The partial deviation may include two types of rainbow ghost path, which may lead to two different types of rainbow effect. The two types of rainbow effect may be type-B rainbow effect 734 and crosstalk rainbow effect 736. The two varying types of rainbow effect may be a result of varying ghost path due to differing nature of deviation by different gratings. In some examples, the output grating may cause the type-B rainbow effect 734, whereas middle grating may cause the crosstalk rainbow effect 736. In some examples, assuming collimated rays are incident on the waveguide configuration at an angle (for example 70°), type-B rainbow effect 734 may be a result of partial deviation that leads to upward progressing path, after the collimated external light comes out of the waveguide configuration 732 (as shown in FIG. 7B). The crosstalk rainbow effect 736 may be a result of partial deviation that leads to downward progressing path after the collimated external light comes out of the waveguide configuration 732 (as shown in FIG. 7B). The upward progressing path or the downward progressing path may propagate and respectively create the type-B rainbow or crosstalk rainbow effect in the gazing direction of the eyebox. The difference in the rainbow ghost path in each type of rainbow effect shall be clear in the following figures.

FIGS. 8A-8B illustrate diagram representation showing various types of rainbow effect caused by different types of deviation in external light. FIG. 8A illustrates type-B rainbow effect, and FIG. 8B illustrates crosstalk rainbow effect. As seen in FIG. 8A, the representation 800 depicts external collimated light 802 falling from an external direction onto a waveguide configuration 804 at an angle less than 90°

(such as, for example, 70°). The external collimated light 802 may be partially deviated by the waveguide configuration 804. To evaluate the rainbow ghost path caused by the partial deviation, a light blocker 808 may be used, which blocks the undeviated rays of the external deviated path but may only allow the partially deviated rays. The partial deviation may lead to upward progressing path 812 that may be project a type-B rainbow effect. In some cases, the type-B rainbow effect may be visible in top half gazing direction of eyebox 814.

The representation 810 shows a rainbow ghost path pertaining to type-B rainbow effect. The arrow 816 may indicate a set of rays that may be a part of the collimated external light 802 of the representation 800, which may be partially deviated by a grating (or VBG) 820 of waveguide configuration 804. During the partial deviation, the set of rays 816 may get reflected at the back of the waveguide configuration, which may further cause a consecutive reflection and diffraction, causing the upward directed path propagation of the set of deviated rays 816 after emergence from the waveguide configuration. The set of rays 818 may project type-B rainbow effect on the eyebox. It may be observed that direction of the set of deviated rays 818 may be majorly or significantly changed in comparison to the direction of the incoming set of rays 816. It may be appreciated that the mentioned manner of deviation of the set of rays 816 may only be exemplary and the corresponding ghost path may be a result of different types of reflection and/or diffraction at various portions of the waveguide configuration.

As seen in FIG. 8B, the representation 850 depicts external collimated light 802 falling from an external direction onto a waveguide configuration 804 at an angle less than 90° (such as, for example, 70°). The external collimated light 802 may be partially deviated by the waveguide configuration 804. Similar to FIG. 8A, to evaluate the rainbow ghost path caused by the partial deviation, light blocker 808 may be used, which blocks the undeviated rays of the external deviated path but may only allow the partially deviated rays. The partial deviation may lead to downward progressing path 852 that may be project a crosstalk rainbow effect on eyebox 814.

The representation 860 shows a rainbow ghost path pertaining to the crosstalk rainbow effect. The arrow 862 may indicate a set of rays that may be a part of the collimated external light 802 of the representation 850, which may be partially deviated by a grating (or VBG) 820 of waveguide configuration 804. During the partial deviation, the set of rays 862 may get reflected at the back of the waveguide configuration, which may a first diffraction and reflection, followed by total internal reflection and a second diffraction and reflection, before propagating out of the waveguide configuration in a downward progressing direction. The set of rays 862 may project crosstalk rainbow effect on the eyebox. It may be observed that direction of the set of deviated rays 864 may be only slightly deviated in comparison to the direction of the set of rays 862. It may be appreciated that the mentioned manner of deviation of the set of rays 862 may only be exemplary and the corresponding ghost path may be a result of different types of reflection and/or diffraction at various portions of the waveguide configuration.

Figure 9A:
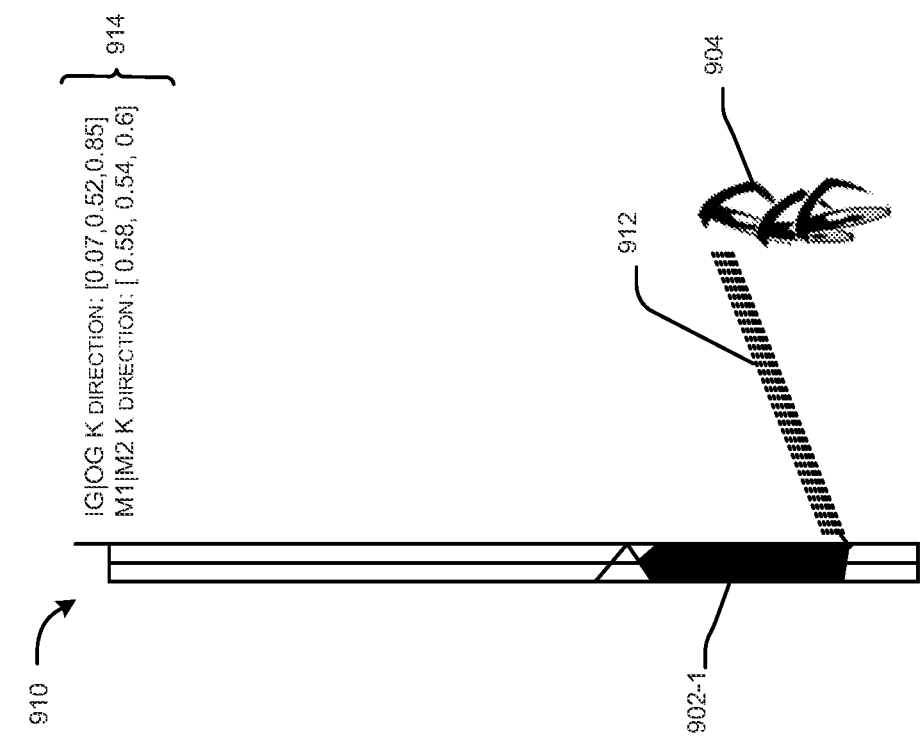
FIG. 9A illustrates a diagram showing presence of type-B rainbow effect in a typical waveguide configuration.

FIG. 9A illustrates presence of type-B rainbow effect in a typical waveguide configuration. As explained in FIG. 8A, the type-B rainbow effect may be caused by partial deviation of external collimated light to result in rays that have an upward progressing direction (or majorly modified direction than incoming external collimated light). As shown in FIG. 9A, a waveguide configuration 902 may include a grating (or VBG) that may cause partial deviation of external collimated light to cause a type-B rainbow effect depicted by emerged set of rays 906. The set of rays 906 may project the rainbow effect mainly in the middle to top part of the gazing direction of the eyebox 904, whereas the rainbow effect may not be visible when a user may gaze towards the downward direction (as shown in FIG. 9A). It should be understood that the arrows depicted in described figures herein (and in other figures also) may represent a plurality of light rays. In an example and as per typical configuration described in FIG. 6, the VBG of the waveguide configuration 902 may have grating co-ordinates/characteristics including original grating vector (k) direction as shown in 908. For example, input grating (IG) and output grating (OG) may have original grating vector (k) direction as [0.11, 0.44, 0.89], whereas two middle gratings (M1, M2) may have original grating vector (k) direction as [0.61, 0.46, 0.65]. The grating characteristics as described in this example may not mitigate rainbow effect observable in a gazing direction of the eyebox 904.

Figure 9B:
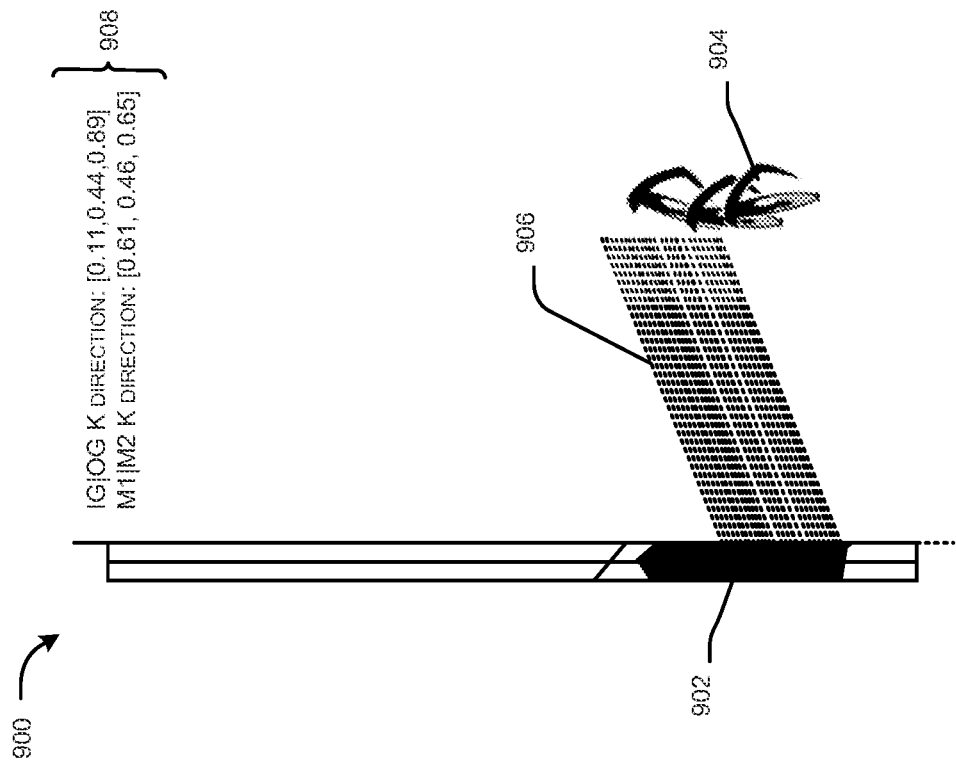
FIG. 9B illustrates a diagram showing a waveguide configuration having tilt adjusted grating for mitigation of rainbow effect shown in FIG. 9A, according to an example.

FIG. 9B illustrates a representation 910 showing mitigation of rainbow effect of FIG. 9A, by using a waveguide configuration having tilt adjusted grating, according to an example. In an example, grating characteristics of waveguide configuration 902 of FIG. 9A may be modified to mitigate rainbow effect (type-B rainbow effect of FIG. 9A), wherein the waveguide configuration with modified grating characteristics is shown as 902-1. The waveguide configuration 902-1 may include a volume Bragg grating (VBG) component for propagating the display light from a projector to an eyebox. The VBG component may include at least one tilt adjusted grating facilitated by adjustment in an original grating vector (k) direction of a grating by a pre-determined value. In some examples, the pre-determined value may pertain to a change in a co-ordinate or a tilt axis pertaining to the original grating vector (k) direction of the grating. In some examples, the tilt adjusted grating may be attained by partial tilting or flipping of the grating to change the co-ordinate or the tilt axis by the pre-determined value, based on type of the rainbow effect and requirements of the propagation of the image. For example, as observed in 914, the grating characteristics (original grating vector (k) direction) of the waveguide configuration 902-1 are modified or adjusted compared to the grating characteristics (original grating vector (k) direction) shown in 908 of FIG. 9A (for waveguide configuration 902). For example, input grating (IG) and output grating (OG) of the waveguide configuration 902-1 may have modified grating vector (k) direction as [0.07, 0.52, 0.85], whereas two middle gratings (M1, M2) may have modified grating vector (k) direction as [0.58, 0.54, 0.6]. As observed in the representation 910, the grating characteristics as described in this example for the waveguide configuration 902-1 may enable to modify the ghost path in such a way that the propagated rays 912 are shifted upwards. It may be appreciated that the mentioned grating characteristics are only exemplary and other values of grating characteristics or original/modified grating vector (k) direction may be possible. Thus, the waveguide configuration 902-1 enables mitigation of the type-B rainbow effect by altering reflection and/or diffraction characteristics of the rainbow ghost path by the tilt adjusted grating in a direction above the gazing direction of the eyebox. Further, the waveguide configuration 902-1 may enable mitigation of the rainbow effect without affecting propagation of the image pertaining to the display light.

For example, the response of the grating, in some instances, may be determined by a grating vector. Since the grating response may be a function of angle, meaning for a given grating vector, a certain incident angle may evoke a strong response to the eyebox. By tilting the grating vector orientation, for example, the strong rainbow path may be moved or redirected to above the eyebox.

Also, the requirement to avoid rainbow may also include the gazing direction, which may be a function of the eye location within the eyebox. For example, at the top of the eyebox, gazing direction may be aimed toward the ceiling, so if a strong rainbow path is directed away from the gazing direction, then the rainbow may be considered avoided (or otherwise mitigated). In such examples, it should be appreciated that only minimal tilt may be needed to move the rainbow just outside of any particular gaze. In some ways, this may help maintain and keep an imaging path unchanged as much as possible. In other words, this may be considered a helpful predetermined positional guide to set a grating orientation. By moving the rainbow completely out of sight, therefore may be a mitigate any such rainbow effects. That said, it should be appreciated that such repositioning may also lead to potential degradation of imaging performance, such as lower imaging efficiency in certain field of view (FOV).

In some examples, the tilt adjusted grating may include the adjustment in the original grating vector (k) direction pertaining to at least one of an input grating, a middle grating or an output grating. For example, the tilt adjusted grating may mitigate the rainbow effect caused by an unexpected deviation of the rainbow ghost path by at least one of the output grating or the middle grating. In some examples, the tilt adjusted grating may mitigate type-B rainbow effect that is a caused by a varied pitch response based upward deviation of collimated external light by the output grating (as explained in FIG. 9A). As shown in FIG. 9B, partial tilting of the grating pertaining to modified grating characteristics shown in 914, may mitigate the rainbow effect (type-B) caused by output grating of the VBG component. In some example, an extent of mitigation of the rainbow effect may be tested by using a blocker between the waveguide configuration and the eyebox, wherein the blocker may block undeviated rays of the collimated external light.

Figure 9D:
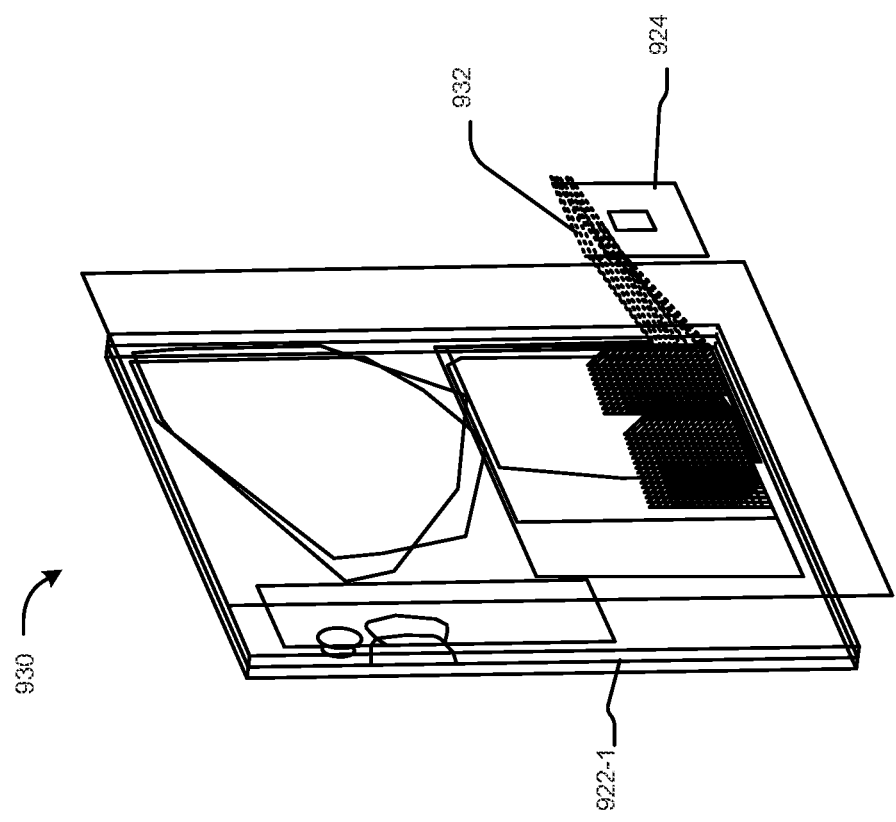
FIG. 9D illustrates a diagram showing a multi-layered waveguide configuration having tilt adjusted grating for mitigation of rainbow effect shown in FIG. 9C, according to an example.
Figure 9C:
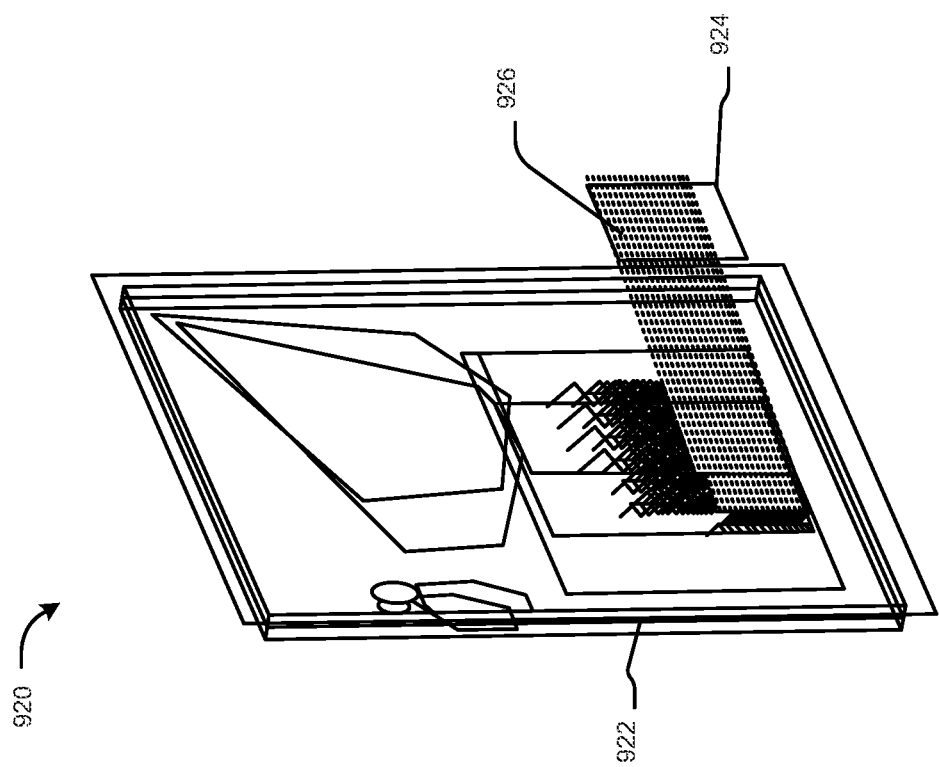
FIG. 9C illustrates a diagram showing presence of type-B rainbow effect in a typical multi-layered waveguide configuration.

In some examples, the waveguide configuration may include single-layered or multi-layered VBG components. For example, in FIGS. 9A and 9B, the waveguide configuration includes single-layered VBG components and hence there may be only one set of rays that exiting after partial deviation from the waveguide configuration. In some examples, the waveguide configuration may include multi-layered VBG components such as, for example, dual layered VBG components so that there may be two set of rays that exit after partial deviation from the waveguide configuration. In this case, to mitigate the rainbow effect, each VBG component may include a waveguide configuration having same or different adjustment of the grating vector (k) direction of the corresponding tilt adjusted grating. FIG. 9C illustrates presence of type-B rainbow effect in a typical multi-layered waveguide configuration.

As shown in FIG. 9C, a waveguide configuration 922 may include dual-layered VBG components that may cause partial deviation of external collimated light to cause a type-B rainbow effect depicted by emerged set of rays 926. The set of rays 926 may be representative of the rainbow ghost path from both layers of the VBG component such that the partial deviation of external collimated light partial may cause two set of rays (shown together as 926). FIG. 9D illustrates mitigation of rainbow effect shown in FIG. 9C, by using a multi-layered waveguide configuration having tilt adjusted grating, according to an example. In an example, grating characteristics of waveguide configuration 922 of FIG. 9C may be modified to mitigate rainbow effect (type-B rainbow effect of FIG. 9C), wherein the waveguide configuration with modified grating characteristics is shown as 922-1 in FIG. 9D. The waveguide configuration 922-1 may include multi-layered volume Bragg grating (VBG) component with at least one tilt adjusted grating facilitated by adjustment in an original grating vector (k) direction by a pre-determined value. In an example, the tilt adjusted grating may include same or different adjustment of the grating vector (k) direction for each VBG component. Thus, the waveguide configuration 922-1 enables mitigation of the type-B rainbow effect by altering reflection and/or diffraction characteristics of the rainbow ghost path by the tilt adjusted grating (of each VBG component) in a direction above the gazing direction of the eyebox. Further, the waveguide configuration 922-1 may enable to mitigate the rainbow effect without affecting propagation of the image pertaining to the display light.

Figure 10A:
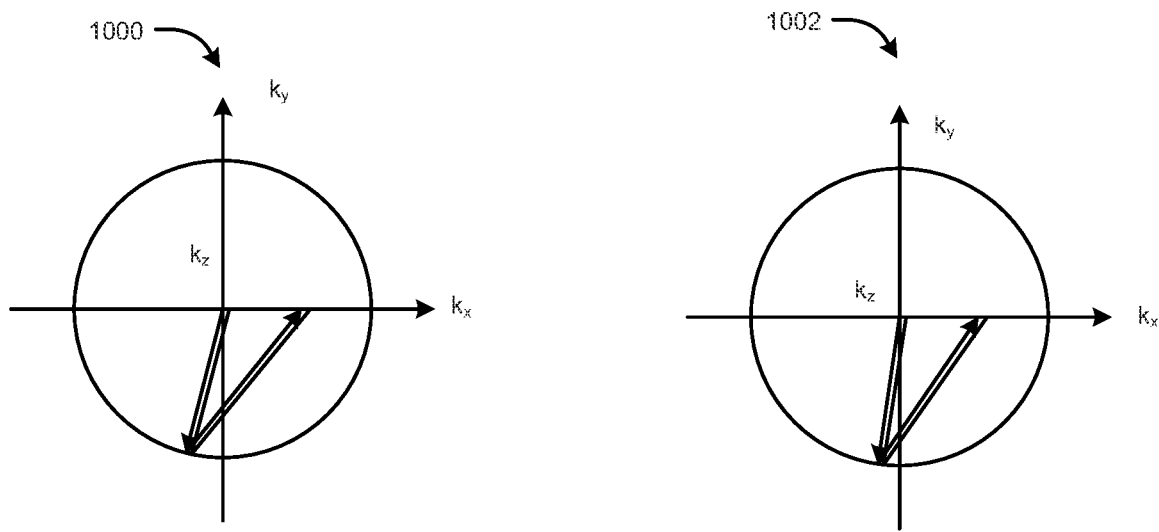
FIG. 10A illustrates a k-vector diagram indicating minimal change in image path propagation effect by using waveguide configuration of FIG. 9B, according to an example.
Figure 10B:
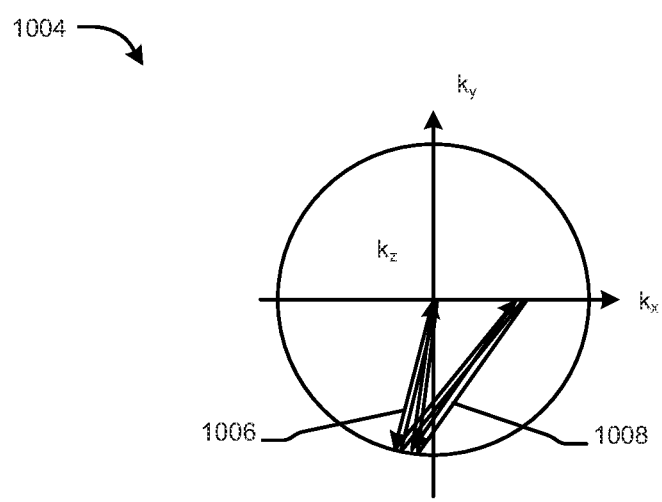
FIG. 10B illustrates a k-vector diagram showing corresponding change in image path propagation effect by using waveguide configuration of FIG. 9D, according to an example.

As a waveguide configuration (including grating or VBG) may be used in a display system of an artificial reality system, the main function of the waveguide configuration may pertain to display an image from a projector by propagation of corresponding display light from the projector to the eyebox. For an enhanced user experience and quality of display, it may be expected that a system mitigating the rainbow effect should not affect the image propagation. The systems and methods described herein enable to attain this objective. FIG. 10A illustrates a diagram showing k-vector diagram showing minimal change in image path propagation effect by using waveguide configuration of FIG. 9B, according to an example. The representation 1000 indicates image path propagation pertaining to original grating vector (k) direction/grating characteristics of waveguide configuration 902 shown in 908 in FIG. 9A, whereas 1002 indicates image path propagation pertaining to modified grating vector (k) direction/grating characteristics of waveguide configuration 902-1 shown in 914 in FIG. 9B. As observed in FIG. 10A, the image path propagation does not alter significantly but the rainbow effect is mitigated effectively. Similarly, FIG. 10B illustrates k-vector diagram showing corresponding change in image path propagation effect by using waveguide configuration of FIG. 9D, according to an example. As seen in combined representation 1004, 1006 may relate to image path propagation pertaining to original grating vector (k) direction/grating characteristics of waveguide configuration 922 in FIG. 9C, whereas 1008 indicates image path propagation pertaining to modified grating vector (k) direction/grating characteristics of waveguide configuration 922-1 in FIG. 9D. The image path propagation does not alter significantly even in case of waveguide configuration 922-1 with multi-layered VBG components, however, the rainbow effect is mitigated effectively.

FIG. 11A illustrates a diagram showing presence of crosstalk rainbow effect in a typical waveguide configuration. As explained in FIG. 8B, a crosstalk rainbow effect may be caused by partial deviation of external collimated light to result in rays that have a downward progressing direction (or slight modified direction than incoming external collimated light angled at 70°). As shown in FIG. 11A, a waveguide configuration 1102 may include a grating (or VBG) that may cause partial deviation of external collimated light to cause crosstalk rainbow effect depicted by emerged set of rays 1106. The set of rays 1106 may project the rainbow effect mainly in the middle to lower part of the gazing direction of eyebox 1104. For example, for a crosstalk rainbow to be experienced, an eye of the user may be in an upward gaze. In an example and as per typical configuration described in FIG. 6, the VBG of the waveguide configuration 1102 may have grating co-ordinates/characteristics including original grating vector (k) direction as shown in 1108. For example, input grating (IG) and output grating (OG) may have original grating vector (k) direction as [0.07, 0.52, 0.85], whereas two middle gratings (M1, M2) may have original grating vector (k) direction as [0.58, 0.54, −0.6]. The grating characteristics as described in this example may not mitigate rainbow effect observable in a gazing direction of the eyebox 1104.

FIG. 11B illustrates mitigation of the crosstalk rainbow effect shown in FIG. 11A, using waveguide configuration having tilt adjusted grating, according to an example. In an example, grating characteristics of waveguide configuration 1102 of FIG. 11A may be modified to mitigate rainbow effect (crosstalk rainbow effect of FIG. 11A), wherein the waveguide configuration with modified grating characteristics is shown as 1102-1. The waveguide configuration 1102-1 may include a volume Bragg grating (VBG) component that may include at least one tilt adjusted grating facilitated by adjustment in an original grating vector (k) direction of a grating by a pre-determined value. In some examples, the pre-determined value may pertain to a change in a co-ordinate or a tilt axis pertaining to the original grating vector (k) direction of the grating. For example, as observed in 914, the grating characteristics (original grating vector (k) direction) of the waveguide configuration 902-1 are modified or adjusted by compared to the grating characteristics (original grating vector (k) direction) shown in 1108 of FIG. 11A (for waveguide configuration 1102). For example, as shown in 1152, input grating (IG) and output grating (OG) of the waveguide configuration 1102-1 may have modified grating vector (k) direction as [0.07, 0.52, 0.85], whereas two middle gratings (M1, M2) may have modified grating vector (k) direction as [0.58, 0.54, 0.6]. In the present example, the middle grating (M1, M2) of waveguide configuration 1102-1 are flipped in comparison to middle gratings 1102, wherein the co-ordinate −0.6 is changed to +0.6 (shown by circle in 1152). In some example, the flipping may mitigate the rainbow effect caused by the middle grating of the VBG component. It may be appreciated that the mentioned grating characteristics are only exemplary and other values of grating characteristics or original/modified grating vector (k) direction may be possible. As observed in the representation 1150, the grating characteristics as described in this example for the waveguide configuration 1102-1 enables to modify the ghost path in such a way that the rays 1106 (seen in FIG. 11A) are shifted and hence not observed in FIG. 11B. It may be appreciated that the ghost path is not observed in FIG. 11B as it may be shifted in a different direction. Thus, the waveguide configuration 1102-1 enables mitigation of the crosstalk rainbow effect by altering reflection and/or diffraction characteristics of the rainbow ghost path by the tilt adjusted grating in a direction above or below the gazing direction of the eyebox 1104. Further, the waveguide configuration 1102-1 may enable to mitigate the rainbow effect without affecting propagation of the image pertaining to the display light.

In an embodiment, the waveguide configuration with modified grating characteristics as described herein may be employed in a display system including a wearable eyewear arrangement. The wearable eyewear arrangement may include a lens assembly including a projector to propagate display light associated with an image. The waveguide configuration with modified grating characteristics may be implemented in the lens assembly. In some examples, projector of the display system may transmit display light to the waveguide configuration with modified grating characteristics. Similar to the basic arrangement in typical configuration 600 of FIG. 6, the projector may output the display light to an input component. The input component may propagate the display light received from the projector to a middle component, which may propagate the received display light to another middle component or the output grating. The output grating may include a grating configuration that may propagate the received display light to an eyebox or a user's eye. The display light may be associated with an image that may be displayed on the eyebox or that a user may otherwise see the image. Specifically, in the present configuration, at least one of the input, the middle or the output components may include modified grating characteristics to mitigate rainbow effect caused by collimated external light, without affecting propagation of the image pertaining to the display light.

In some examples. the waveguide configuration with modified grating characteristics may include any number of VBG components that may be exposed into a "see-through" photopolymer material, such as glass or plastic. In some examples and as discussed above, one or more of the components may be patterned (e.g., using sinusoidal patterning) into and/or on a surface of the photopolymer material. In this way, the entire waveguide configuration may be relatively transparent so that a user may see through to the other side. At the same time, the waveguide configuration with modified grating characteristics, may (among other things) receive the propagated display light from the projector and exit the propagated display light in front of a user's eyes for viewing. In this way any number of augmented reality (AR) and/or mixed reality (MR) environments may be provided to and experienced by the user. In addition, in some examples, the arrangement of components in the waveguide configuration may be implemented to "expand" (i.e., horizontally and/or vertically) a region in space to be viewed so that a user may view a displayed image regardless of where a pupil of a user's eye may be. As such, in some examples, by expanding this viewing region, the arrangement of the components may ensure that a user may move their eye in various directions and still view the displayed image, without any rainbow effect.

In some examples, the display system as described herein may be in form of glasses, spectacles, googles or other forms of eyewear that include a first lens assembly (for user's right eye) and a second lens assembly (for user's left eye). The first lens assembly may include a first temple arm and the second lens assembly including a second temple arm that may be positioned next to a user's right temple and user's left temple respectively, when the display system is positioned with respect to the user's eyes. In some examples, near each temple arm, a projector may be positioned, wherein each projector may be positioned and configured to direct display light from the respective projector into the components of the waveguide configuration that further projects the display light onto an eyebox positioned near the respective eyes of the user. Accordingly, in some examples, the first lens assembly and the second lens assembly may present a first image and a second image, respectively, to be viewed by a user's respective eye, when wearing the display system, to generate a simultaneous, "binocular" viewing. That is, in some examples, the first image projected by the first lens assembly and the second image projected on the second lens assembly may be uniformly and symmetrically "merged" to create a binocular visual effect for a user of the display system. In other examples, one of the first lens assembly or the second lens assembly may be omitted from the display system such that a monocular viewing is provided to a user of the display system.

In an example, an augmented reality system may include the display system in the previous examples as described herein. The display system may include a wearable eyewear arrangement that includes a lens assembly. The lens assembly may include a projector and a waveguide configuration. The projector may propagate display light associated with an image. The waveguide configuration may propagate the display light to an eyebox. The waveguide configuration may include a volume Bragg grating (VBG) component for propagating the display light from a projector to an eyebox. The VBG component may include at least one tilt adjusted grating facilitated by adjustment in an original grating vector (k) direction of a grating by a pre-determined value. The tilt adjusted grating may facilitate to mitigate a rainbow effect observable in a gazing direction of the eyebox. The rainbow effect may be mitigated by modification of a rainbow ghost path away from the gazing direction without affecting propagation of the image pertaining to the display light. In some examples, the tilt adjusted grating may include the adjustment in the original grating vector (k) direction pertaining to at least one of an input grating, a middle grating or an output grating. In some examples, the pre-determined value may pertain to a change in a co-ordinate or a tilt axis pertaining to the original grating vector (k) direction. In some examples, the tilt adjusted grating may be attained by partial tilting or flipping of the grating to change the co-ordinate or the tilt axis by the pre-determined value, based on the type of the rainbow effect and the requirements of the propagation of the image. In some examples, the AR system may include a waveguide configuration with single-layered or multi-layered VBG components.

Figure 12:
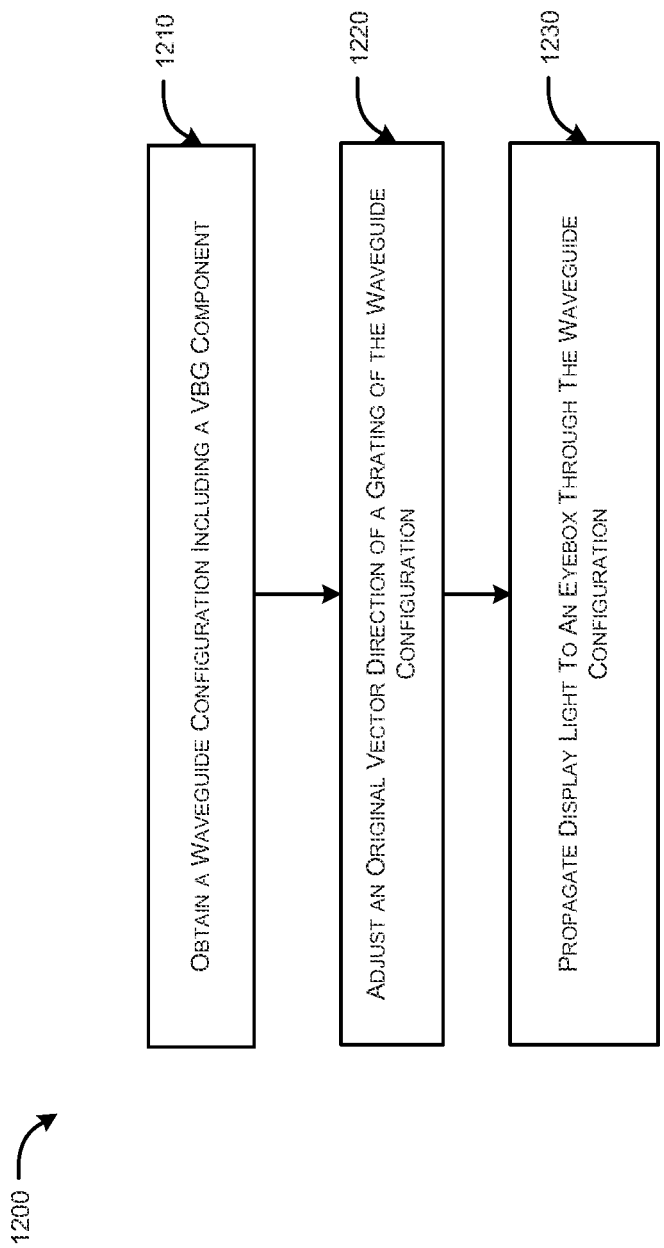
FIG. 12 illustrates a flow diagram of a method to implement a waveguide configuration for mitigating rainbow effect, according to an example.

FIG. 12 illustrates a method to implement a waveguide configuration to mitigate rainbow effect, according to an example. The method 1200 is provided by way of example, as there may be a variety of ways to carry out the method described herein. Each block shown in FIG. 12 may further represent one or more processes, methods, or subroutines, and one or more of the blocks may include machine-readable instructions stored on a non-transitory computer-readable medium and executed by a processor or other type of processing circuit to perform one or more operations described herein.

Although the method 1200 is primarily described as being performed by configurations as shown in the previous figures pertaining to the systems and methods described herein, the method 1200 may be executed or otherwise performed by other systems, or a combination of systems. It should also be appreciated that, in some examples, the method 1200 may be implemented in conjunction with a content platform (e.g., a social media platform) to generate and deliver content.

Reference is now made with respect to FIG. 12. At 1210, the method may include a step of obtaining a waveguide configuration for implementation in a lens assembly. In some examples, the waveguide configuration may include a volume Bragg grating (VBG) component.

At 1220, the method may include a step of adjusting, by a pre-determined value, an original grating vector (k) direction of a grating of the waveguide configuration to obtain at least one tilt adjusted grating.

At 1230, the method may include propagating, through the waveguide configuration, the display light to an eyebox. The display light may be associated with an image and is propagated to the waveguide configuration through a projector of the lens assembly. The tilt adjusted grating may facilitate to mitigate a rainbow effect observable in a gazing direction of the eyebox. The rainbow effect may be mitigated by modification of a rainbow ghost path away from the gazing direction without affecting propagation of the image pertaining to the display light. In some examples, the tilt adjusted grating may be tiled by a few degrees to avoid a type-B rainbow. As described above, it should be appreciated that one of the goals is to avoid a rainbow effect in gazing while having a minimal to zero effect on image quality in the imaging path.

In examples that involve flipping, it should be appreciated that flipping the z components of the grating vector may achieve the desired effect, and without severely impacting, if at all, its effect on imaging quality. In terms of fabrication of this grating, it should be appreciated that this may be achieved any number of two- or dual-beam interference exposure systems. In other words, by adjusting a sample orientation relative to the two interference beam, the grating vector orientation may be configured/controlled at any tilt being specified, for both tilt or flip, or other orientation. It should be appreciated that in any proper design may need to specify the grating vector orientation prior to fabrication.

In some examples, the tilt adjusted grating includes the adjustment in the original grating vector (k) direction pertaining to at least one of an input grating, a middle grating or an output grating. In some examples, the pre-determined value may pertain to a change in a co-ordinate or a tilt axis pertaining to the original grating vector (k) direction. In some examples, the tilt adjusted grating may be attained by partial tilting or flipping of the grating to change the co-ordinate or the tilt axis by the pre-determined value, based on the type of the rainbow effect and the requirements of the propagation of the image.

In the foregoing description, various inventive examples are described, including devices, systems, methods, and the like. For the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples.

The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example' is not necessarily to be construed as preferred or advantageous over other embodiments or designs.

Although the methods and systems as described herein may be directed mainly to digital content, such as videos or interactive media, it should be appreciated that the methods and systems as described herein may be used for other types of content or scenarios as well. Other applications or uses of the methods and systems as described herein may also include social networking, marketing, content-based recommendation engines, and/or other types of knowledge or data-driven systems.

The invention claimed is:

1. A display system, comprising:
a wearable eyewear arrangement, comprising:
a lens assembly comprising:
a projector to propagate display light associated with an image; and
a waveguide configuration comprising a volume Bragg grating (VBG) component for propagating the display light from a projector to an eyebox,
wherein the VBG component includes at least one tilt adjusted grating facilitated by adjustment in an original grating vector (k) direction of a grating by a pre-determined value, the pre-determined value pertaining to a change in a co-ordinate or a tilt axis pertaining to the original grating vector (k) direction of the grating,
wherein the tilt adjusted grating facilitates to mitigate a rainbow effect observable in a gazing direction of the eyebox, and
wherein the rainbow effect is mitigated by modification of a rainbow ghost path away from the gazing direction without affecting propagation of the image pertaining to the display light.

2. The display system of claim 1, wherein the tilt adjusted grating includes the adjustment in the original grating vector (k) direction pertaining to at least one of an input grating, a middle grating or an output grating.

3. The display system of claim 2, wherein the tilt adjusted grating mitigates the rainbow effect caused by an unexpected deviation of the rainbow ghost path by at least one of the output grating or the middle grating.

4. The display system of claim 2, wherein the tilt adjusted grating mitigates a type-B rainbow effect that is a caused by a varied pitch response based upward deviation of collimated external light by the output grating, and wherein the tilt adjusted grating mitigates a crosstalk ghost rainbow effect that is caused by a downward deviation of the collimated external light by the middle grating.

5. The display system of claim 4, wherein an extent of mitigation of the rainbow effect is tested by using a blocker between the waveguide configuration and the eyebox, and wherein the blocker blocks undeviated rays of the collimated external light.

6. The display system of claim 2, wherein a partial tilting mitigates the rainbow effect caused by the output grating of the VBG component.

7. The display system of claim 1, wherein the tilt adjusted grating is attained by partial tilting or flipping of the grating to change the co-ordinate or the tilt axis by the pre-determined value, based on type of the rainbow effect and requirements of the propagation of the image.

8. The display system of claim 7, wherein the flipping mitigates the rainbow effect caused by the middle grating of the VBG component.

9. The display system of claim 1, wherein the waveguide configuration comprises a single-layered or multi-layered VBG components.

10. The display system of claim 9, wherein each VBG component includes a same or a different adjustment of the grating vector (k) direction of the corresponding tilt adjusted grating.

11. The display system of claim 1, wherein reflection or diffraction characteristics of the rainbow ghost path are altered by the tilt adjusted grating in a direction above or below the gazing direction of the eyebox.

12. The display system of claim 1, wherein each VBG component includes a same or a different adjustment of the grating vector (k) direction of the corresponding tilt adjusted grating.

13. An augmented reality (AR) system comprising:
a display system comprising a wearable eyewear arrangement that includes:
a lens assembly comprising:
a projector to propagate display light associated with an image; and
a waveguide configuration comprising a volume Bragg grating (VBG) component for propagating the display light from a projector to an eyebox,
wherein the VBG component includes at least one tilt adjusted grating facilitated by adjustment in an original grating vector (k) direction of a grating by a pre-determined value, the pre-determined value pertaining to a change in a co-ordinate or a tilt axis pertaining to the original grating vector (k) direction of the grating,
wherein the tilt adjusted grating facilitates to mitigate a rainbow effect observable in a gazing direction of the eyebox, and
wherein the rainbow effect is mitigated by modification of a rainbow ghost path away from the gazing direction without affecting propagation of the image pertaining to the display light.

14. The AR system of claim 13, wherein the tilt adjusted grating includes the adjustment in the original grating vector (k) direction pertaining to at least one of an input grating, a middle grating or an output grating.

15. The AR system of claim 14, wherein the tilt adjusted grating mitigates the rainbow effect caused by an unexpected deviation of the rainbow ghost path by at least one of the output grating or the middle grating.

16. The AR system of claim 14, wherein the tilt adjusted grating is attained by partial tilting or flipping of the grating to change the co-ordinate or the tilt axis by the pre-determined value, based on a type of the rainbow effect and requirements of the propagation of the image.

17. The AR system of claim 13, wherein the waveguide configuration comprises a single-layered or multi-layered VBG components.

18. A method comprising:
obtaining a waveguide configuration for implementation in a lens assembly, wherein the waveguide configuration comprises a volume Bragg grating (VBG) component;
adjusting, by a pre-determined value, an original grating vector (k) direction of a grating of the waveguide configuration to obtain at least one tilt adjusted grating, the pre-determined value pertaining to a change in a co-ordinate or a tilt axis pertaining to the original grating vector (k) direction of the grating; and
propagating, through the waveguide configuration, a display light to an eyebox, wherein the display light is associated with an image and is propagated to the waveguide configuration through a projector of the lens assembly,
wherein the tilt adjusted grating facilitates to mitigate a rainbow effect observable in a gazing direction of the eyebox, and wherein the rainbow effect is mitigated by modification of a rainbow ghost path away from the gazing direction without affecting propagation of the image pertaining to the display light.

19. The method of claim 18, wherein the tilt adjusted grating includes the adjustment in the original grating vector (k) direction pertaining to at least one of an input grating, a middle grating or an output grating.

20. The method of claim 18, wherein each VBG component includes a same or a different adjustment of the grating vector (k) direction of the corresponding tilt adjusted grating.

* * * * *